US010774678B2

(12) United States Patent
Snyder et al.

(10) Patent No.: US 10,774,678 B2
(45) Date of Patent: Sep. 15, 2020

(54) TURBINE ASSEMBLY WITH AUXILIARY WHEEL

(71) Applicant: Rolls-Royce Corporation, Indianapolis, IN (US)

(72) Inventors: Brandon R. Snyder, Greenwood, IN (US); Michael R. Whitten, Zionsville, IN (US); James E. Sellhorn, Indianapolis, IN (US); Bradford John Riehle, Plainfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 689 days.

(21) Appl. No.: 15/587,314

(22) Filed: May 4, 2017

(65) Prior Publication Data

US 2018/0320544 A1 Nov. 8, 2018

(51) Int. Cl.
| | |
|---|---|
| *F03B 3/12* | (2006.01) |
| *F01D 21/00* | (2006.01) |
| *F01D 5/02* | (2006.01) |
| *G01P 3/44* | (2006.01) |
| *G01M 15/14* | (2006.01) |
| *G01P 3/488* | (2006.01) |
| *F01D 17/06* | (2006.01) |
| *F01D 21/02* | (2006.01) |

(52) U.S. Cl.
CPC ........... *F01D 21/003* (2013.01); *F01D 5/027* (2013.01); *F01D 17/06* (2013.01); *F01D 21/02* (2013.01); *G01M 15/14* (2013.01); *G01P 3/44* (2013.01); *G01P 3/488* (2013.01); *F05D 2220/32* (2013.01); *F05D 2240/24* (2013.01); *F05D 2240/60* (2013.01); *F05D 2260/33* (2013.01)

(58) Field of Classification Search
CPC .......... F01D 5/066; F01D 5/025; F01D 5/027; F01D 17/06; F01D 21/003
USPC ...................................................... 416/220 R
See application file for complete search history.

(56) References Cited

U.S. PATENT DOCUMENTS

| | | |
|---|---|---|
| 2,595,787 A | 5/1952 | Heimann |
| 2,749,162 A | 6/1956 | Humphrey |
| 3,094,309 A | 6/1963 | Hull, Jr. et al. |
| 4,177,692 A | 12/1979 | Irwin |
| 4,220,055 A | 9/1980 | Dubois et al. |
| 4,294,135 A | 10/1981 | Tameo |
| 4,361,213 A | 11/1982 | Landis, Jr. et al. |

(Continued)

FOREIGN PATENT DOCUMENTS

| | | |
|---|---|---|
| EP | 2503098 A2 | 9/2012 |
| EP | 2960432 A1 | 12/2015 |

(Continued)

OTHER PUBLICATIONS

Woodward, Application "Speed Sensing for Gas & Steam Turbines," Application Note 51429 (Revision New) Original Instructions, Fort Collins, Colorado, Dec. 2012 Colorado, 12pgs.

*Primary Examiner* — Long T Tran
*Assistant Examiner* — James J Kim
(74) *Attorney, Agent, or Firm* — Shumaker & Sieffert, P.A.

(57) ABSTRACT

Various embodiments of the present application provide one or more of: (1) auxiliary wheel that (a) enables accurate speed detection of a turbine disc and/or (b) presents a machining surface for balance correction; and/or (2) techniques for mounting an auxiliary wheel to a rotor, such as a turbine disc.

17 Claims, 21 Drawing Sheets

(56) References Cited

U.S. PATENT DOCUMENTS

| | | | |
|---|---|---|---|
| 4,386,784 A * | 6/1983 | Banks | F01D 5/225 277/410 |
| 4,784,012 A | 11/1988 | Marra | |
| 4,817,455 A | 4/1989 | Buxe | |
| 4,835,827 A | 6/1989 | Marra | |
| 4,848,182 A | 7/1989 | Novotny | |
| 4,926,710 A | 5/1990 | Novotny | |
| 5,049,158 A | 9/1991 | Engelhardt et al. | |
| 5,288,210 A | 2/1994 | Albrecht et al. | |
| 5,537,814 A * | 7/1996 | Nastuk | F01D 5/066 60/796 |
| 5,582,077 A | 12/1996 | Agram et al. | |
| 5,733,103 A | 3/1998 | Wallace et al. | |
| 5,816,776 A | 10/1998 | Chambon et al. | |
| 6,354,780 B1 | 3/2002 | Davis et al. | |
| 6,471,453 B1 | 10/2002 | Winebrenner et al. | |
| 6,494,679 B1 | 12/2002 | Gadre et al. | |
| 6,893,222 B2 | 5/2005 | Allam | |
| 7,377,749 B2 | 5/2008 | Charrier et al. | |
| 8,186,954 B2 | 5/2012 | Lee et al. | |
| 8,348,616 B2 | 1/2013 | Williams et al. | |
| 8,353,670 B2 | 1/2013 | Glasspoole et al. | |
| 8,506,253 B2 | 8/2013 | Lecuyer et al. | |
| 8,631,578 B2 | 1/2014 | Glasspoole et al. | |
| 8,888,458 B2 | 11/2014 | Billings et al. | |
| 8,979,502 B2 * | 3/2015 | Paquet | F01D 5/3015 416/244 A |
| 9,103,220 B2 | 8/2015 | Garin et al. | |
| 9,217,331 B1 | 12/2015 | Yellapragada et al. | |
| 9,511,457 B2 | 12/2016 | Stone | |
| 9,567,857 B2 | 2/2017 | Snyder | |
| 10,323,519 B2 | 6/2019 | Porter et al. | |
| 2001/0038771 A1 | 11/2001 | Wirth et al. | |
| 2002/0134191 A1 | 9/2002 | Czerniak et al. | |
| 2003/0194318 A1 | 10/2003 | Duesler et al. | |
| 2004/0156708 A1 | 8/2004 | Allam | |
| 2005/0013696 A1 * | 1/2005 | Le Jeune | F01D 5/066 416/244 A |
| 2005/0129498 A1 | 6/2005 | Brooks | |
| 2005/0175459 A1 | 8/2005 | Gagner | |
| 2005/0214101 A1 | 9/2005 | Dexter et al. | |
| 2006/0130456 A1 | 6/2006 | Suciu et al. | |
| 2007/0020089 A1 | 1/2007 | Forgue et al. | |
| 2007/0126292 A1 * | 6/2007 | Lugg | F03H 99/00 310/11 |
| 2007/0237646 A1 * | 10/2007 | Shi | F01D 5/025 416/244 A |
| 2008/0095613 A1 | 4/2008 | Blanchard et al. | |
| 2009/0087313 A1 | 4/2009 | Belmonte et al. | |
| 2010/0080705 A1 | 4/2010 | Pronovost et al. | |
| 2010/0312504 A1 * | 12/2010 | Rossi | G01H 1/003 702/56 |
| 2010/0316496 A1 | 12/2010 | Williams et al. | |
| 2011/0027085 A1 | 2/2011 | Glasspoole et al. | |
| 2011/0044816 A1 | 2/2011 | Lecuyer et al. | |
| 2011/0078901 A1 | 4/2011 | Glasspoole et al. | |
| 2011/0091324 A1 | 4/2011 | Holzschuh | |
| 2012/0107094 A1 | 5/2012 | Lillis | |
| 2012/0201681 A1 | 8/2012 | Chauveau et al. | |
| 2012/0207603 A1 | 8/2012 | Woods et al. | |
| 2012/0244004 A1 | 9/2012 | Virkler | |
| 2012/0279351 A1 | 11/2012 | Gu et al. | |
| 2012/0311835 A1 | 12/2012 | Caprario et al. | |
| 2013/0086805 A1 | 4/2013 | Pronovost et al. | |
| 2013/0156589 A1 | 6/2013 | Paquet et al. | |
| 2013/0199279 A1 | 8/2013 | Boles et al. | |
| 2013/0209260 A1 | 8/2013 | Stone | |
| 2013/0236310 A1 | 9/2013 | Billings et al. | |
| 2014/0050577 A1 | 2/2014 | Dimmick, III et al. | |
| 2014/0271144 A1 * | 9/2014 | Landwehr | F01D 25/246 415/173.1 |
| 2014/0301849 A1 | 10/2014 | Snyder | |
| 2014/0338193 A1 | 11/2014 | Wilson | |
| 2015/0330224 A1 | 11/2015 | Casaliggi et al. | |
| 2016/0017737 A1 | 1/2016 | Partyka | |
| 2016/0097395 A1 | 4/2016 | Pruitt | |
| 2016/0123150 A1 | 5/2016 | Stone et al. | |
| 2016/0146112 A1 * | 5/2016 | Van der Merwe | F02C 7/36 475/331 |
| 2016/0153848 A1 * | 6/2016 | Rousselin | F16O 41/007 324/676 |
| 2016/0237824 A1 | 8/2016 | Himes et al. | |
| 2016/0326877 A1 | 11/2016 | Boewing | |
| 2016/0327065 A1 | 11/2016 | Boewing | |
| 2016/0333785 A1 * | 11/2016 | Sener | F01D 11/08 |
| 2016/0362995 A1 | 12/2016 | Albers | |
| 2016/0363001 A1 | 12/2016 | Argote et al. | |
| 2017/0022907 A1 | 1/2017 | Argote et al. | |
| 2017/0058675 A1 | 3/2017 | Morrison et al. | |
| 2017/0074104 A1 | 3/2017 | Stone | |
| 2017/0114651 A1 * | 4/2017 | Snyder | F01D 5/3015 |
| 2017/0115320 A1 | 4/2017 | Turner | |
| 2017/0191374 A1 * | 7/2017 | Boettner | F01D 21/003 |
| 2017/0218767 A1 | 8/2017 | Stone et al. | |
| 2017/0321556 A1 | 11/2017 | Pankratov | |
| 2017/0322233 A1 * | 11/2017 | Grambichler | G01P 13/045 |
| 2018/0003073 A1 | 1/2018 | Rowe et al. | |
| 2018/0010479 A1 | 1/2018 | Mason et al. | |
| 2018/0087384 A1 | 3/2018 | Pankratov et al. | |
| 2018/0087534 A1 | 3/2018 | Binsteiner et al. | |
| 2018/0320522 A1 | 11/2018 | Snyder et al. | |
| 2018/0320523 A1 | 11/2018 | Snyder et al. | |
| 2018/0320533 A1 | 11/2018 | Snyder et al. | |
| 2018/0320544 A1 | 11/2018 | Snyder et al. | |
| 2018/0320601 A1 | 11/2018 | Snyder et al. | |

FOREIGN PATENT DOCUMENTS

| | | |
|---|---|---|
| EP | 3103969 A1 | 12/2016 |
| EP | 3263846 A1 | 1/2018 |
| EP | 3266990 A1 | 1/2018 |

* cited by examiner

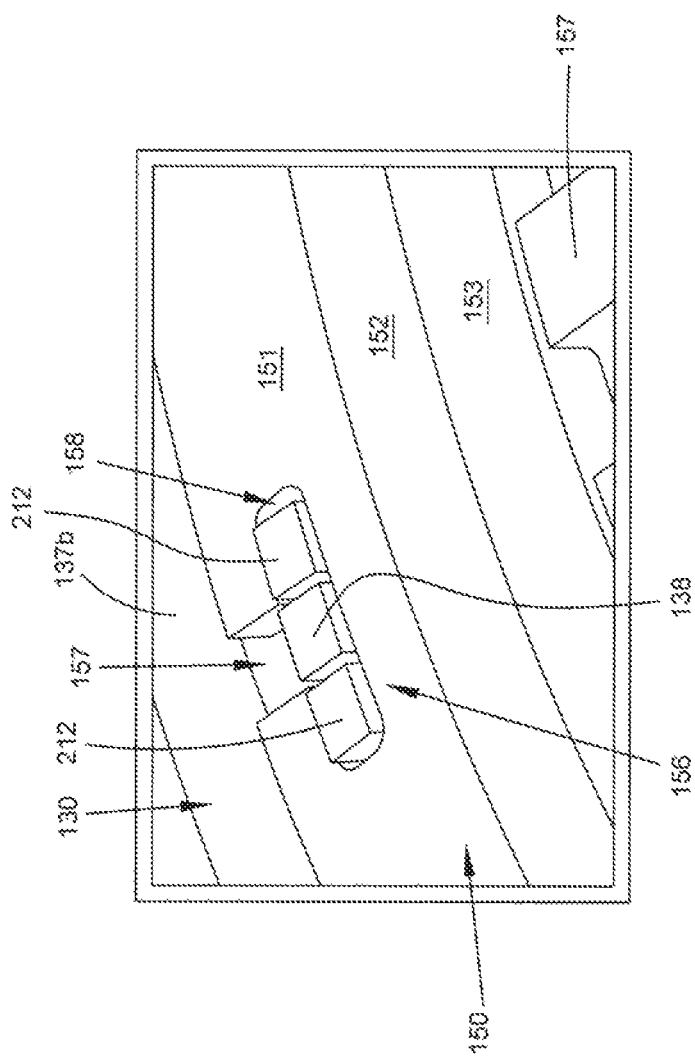

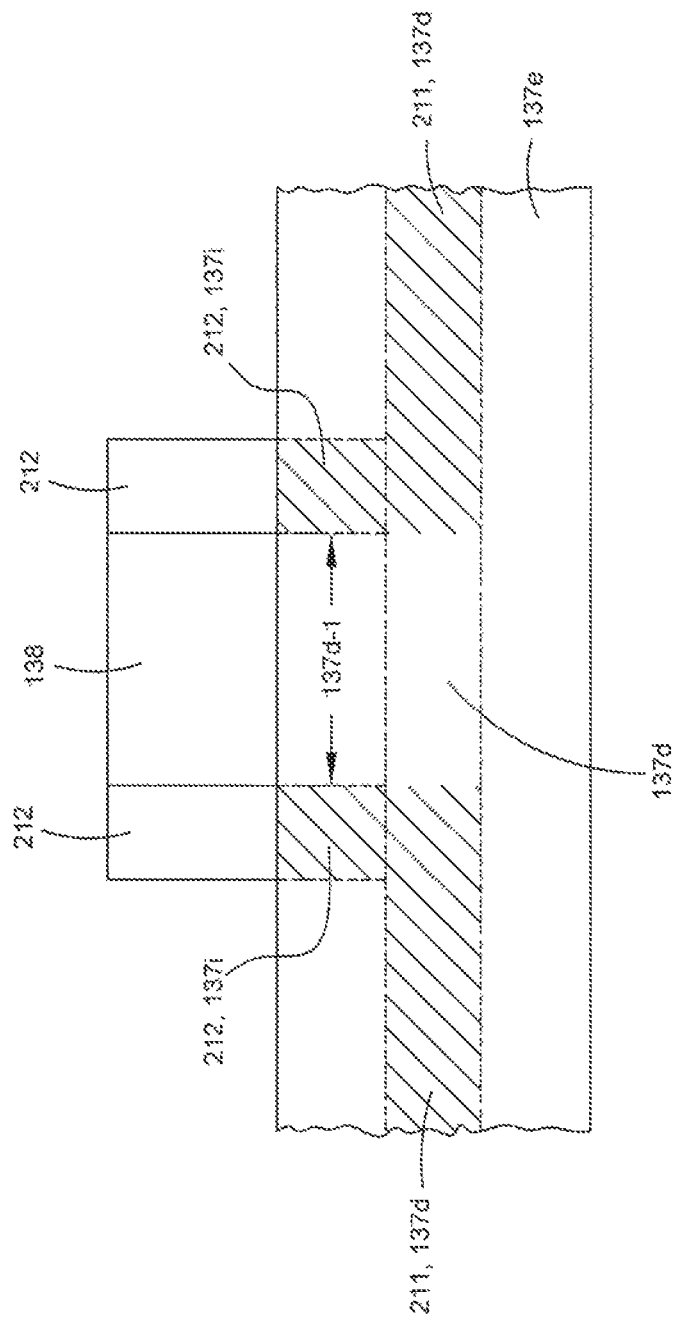

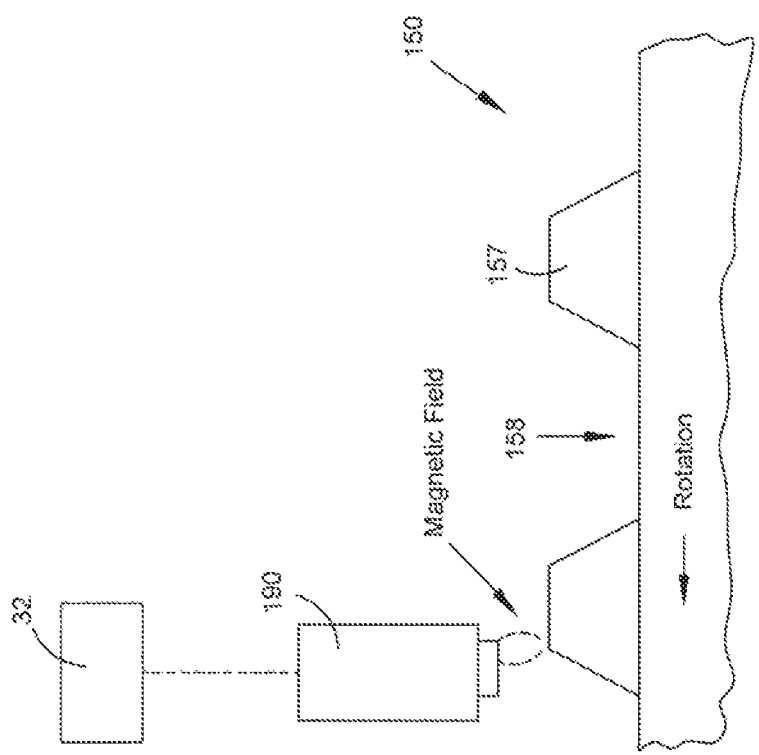

TURBINE ASSEMBLY WITH AUXILIARY WHEEL

RELATED APPLICATIONS

This patent application relates to U.S. application Ser. Nos. 15/587,310, 15/587,318, 15/587,319 and 15/587,322, all of which were filed on May 4, 2017. The entire contents of these documents are hereby incorporated by reference.

BACKGROUND

Gas turbine engines are known in the art and typically include at least one upstream compressor rotor coupled to a downstream turbine rotor via a driveshaft. A combustor may be disposed between the compressor rotor and the turbine rotor. A fuel valve supplies fuel to the combustor. The combustor ignites the fuel, which consumes air drawn into the engine by the compressor rotor. Combustion products flow downstream to drive or spin the turbine rotor. The turbine rotor torques the compressor rotor via the driveshaft and the cycle continues.

A driveshaft may fracture, thus decoupling the turbine rotor from the compressor rotor and enabling the turbine rotor to accelerate to an uncontainable speed. Eventually, the turbine rotor may breach the engine housing. Turbine overspeed protection is thus desirable for safe operation of a gas turbine engine.

SUMMARY

Various embodiments of the present application provide one or more of: (1) auxiliary wheel that (a) enables accurate speed detection of a turbine disc and/or (b) presents a machining surface for balance correction; and/or (2) techniques for mounting an auxiliary wheel to a rotor, such as a turbine disc.

One disclosed method of balancing a rotor assembly may comprise: affixing an auxiliary wheel to a rotor disc, the auxiliary wheel comprising an annular balance land; coupling the rotor disc with a coaxial driveshaft; spinning the driveshaft to rotate the auxiliary wheel and the rotor disc as a unit; estimating a center of rotation of the unit; and grinding the annular balance land of the auxiliary wheel based on a difference between the estimated center of rotation of the unit and a central axis of the driveshaft.

Disclosed is a rotor assembly. The rotor assembly may comprise: a rotor disc; and an auxiliary wheel affixed to the rotor disc and comprising an annular balance land.

Disclosed is a turbine assembly. The turbine assembly may comprise: (a) a turbine disc connected to a coaxial central shaft; (b) an auxiliary wheel secured to the turbine disc and coaxial with the central shaft, the auxiliary wheel comprising an annular target portion.

The target portion may comprise a plurality of first features and a plurality of different second features, the plurality of first features alternating with the plurality of second features about a circumference of the annular target portion.

The turbine assembly may include (c) a speed sensing system comprising a probe and a controller, the speed sensing system being configured to estimate a rotational speed of the turbine disc based on a rate that the plurality of first features and the plurality of second features are carried past the probe.

Disclosed is an engine. The engine may include (a) a turbine assembly, wherein the central shaft is a spool mechanically coupling the turbine disc with one of a fan and a compressor; (b) a fuel supply valve, and a spool speed sensor configured to sense a rotational speed of the spool at a location upstream of the turbine disc; (c) a controller configured to: (i) estimate a rotational speed of the spool based on reports from the spool speed sensor, (ii) compare the estimated rotational speed of the spool with the estimated rotational speed of the turbine disc, and (iii) adjust the fuel supply valve based on the comparison.

Disclosed is a turbine assembly. The turbine assembly may comprise: a turbine disc connected to a coaxial central shaft; an auxiliary wheel secured to the turbine disc and coaxial with the central shaft, the auxiliary wheel comprising an annular target portion, the target portion comprising a plurality of first features and a plurality of different second features, the plurality of first features alternating with the plurality of second features about a circumference of the auxiliary wheel.

Disclosed is a gas turbine engine. The gas turbine engine may comprise: (a) a turbine disc connected to a coaxial central shaft, the turbine disc comprising an annular mount coaxial with the central shaft; (b) an auxiliary wheel secured to the turbine disc and directly disposed on the annular mount, the auxiliary wheel being coaxial with the central shaft, the auxiliary wheel comprising an annular target portion, the target portion comprising a plurality of magnetic teeth spaced about a circumference of the auxiliary wheel; (c) a speed sensing system comprising a controller and a probe with a magnet, the speed sensing system being configured to estimate a rotational speed of the turbine disc based on a rate that the plurality of magnetic teeth are carried past the probe.

Disclosed is a method of sensing a rotational speed of a turbine disc of a turbine assembly. The turbine assembly may comprise: (a) the turbine disc, which is connected to a coaxial central shaft; (b) the auxiliary wheel, which is secured to the turbine disc and coaxial with the central shaft, the auxiliary wheel comprising an annular target portion, the target portion comprising a plurality of first features and a plurality of second features, the plurality of first features alternating with the plurality of second features about a circumference of the annular target portion; and (c) a speed sensing system comprising a probe and a controller.

The method may comprise, via the speed sensing system: estimating a rotational speed of the turbine disc based on a rate that the plurality of first features and the plurality of second features are carried past the probe.

Disclosed is a turbomachine. The turbomachine may have a non-magnetic turbine disc carried by a rotating shaft and a system for detecting an overspeed condition of the disc using a magnetic probe positioned in proximity to a magnetic target carried past the probe during rotation of the shaft. The system may comprise an annular spanner nut threadably mounted on the disc for axially engaging a turbine disc coverplate, said spanner nut comprising a speed sensor target having a plurality of teeth spaced about the circumference thereof.

Disclosed is a turbine rotor assembly, which may comprise: (a) a turbine disc carried by a rotating shaft; (b) a coverplate carried by said turbine disc; (c) an annular spanner nut threadably mounted to said turbine disc and axially engaging said coverplate, said spanner nut comprising a speed sensor target having a plurality of teeth spaced about the circumference thereof; and (d) a magnetic probe positioned proximate the speed sensor target so that rotation of the shaft carries the plurality of teeth past the probe, said probe being configured to detect the speed of the teeth passing the probe.

Disclosed is a turbine rotor assembly, which may comprise: (a) a turbine disc carried by a rotating shaft; (b) a coverplate carried by said turbine disc; (c) an annular spanner nut threadably mounted to said turbine disc and axially engaging said coverplate, said spanner nut comprising at least one of a speed sensor target having a plurality of teeth spaced about the circumference thereof or a balance land having an annular machinable surface.

Disclosed is a retaining collar for a bayonet mount, which may comprise: (a) a ring-shaped body having a pair of circumferential end portions separated by a circumferential gap, and an arcuate radial outer surface extending circumferentially between the end portions, said body being dimensioned so that the radial outer surface frictionally engages a radial inner surface of a cylindrical male mounting member in a bayonet mount; and (b) a pair of retention pins, each pin extending radially outward from one of the circumferential end portions, each of said retention pins being dimensioned to extend radially outward from said body through an aperture defined by a cylindrical male mounting member in a bayonet mount.

Disclosed is a turbine rotor assembly, which may comprise: a rotor disc having a male mounting member comprising: a cylindrical radially inward facing surface; a cylindrical radially outward facing mounting surface; a plurality of radially outward extending mounting pins spaced about the circumference of said mounting surface; and a pair of apertures defined by said mounting member, each aperture being adjacent one of said mounting pins.

The assembly may include an auxiliary annular wheel having a female mounting member comprising: a cylindrical radially inward facing mounting surface; and a plurality of mounting slots defined by said mounting member and being spaced about the circumference of said mounting member, each of said mounting slots having an open axially extending portion and a closed circumferentially extending portion.

The auxiliary annular wheel may be carried by said rotor disc in a predetermined axial and radial alignment wherein said radially inward facing mounting surface of said wheel frictionally engages said radially outward facing mounting surface of said rotor disc and each of said mounting pins is positioned adjacent a closed end of a circumferentially extending portion of one of said mounting slots.

The assembly may include a retaining collar comprising: a ring-shaped body having a pair of end portions separated by a gap, and an arcuate radially outward facing surface extending between said end portions; and a pair of retention pins, each pin extending radially outward from one of the circumferential end portions.

The retaining collar may be positioned so that said radially outward facing surface frictionally engages said radially inward facing surface of said male mounting member and each of said retention pins extends radially outward from said body through one of said apertures and one of said mounting slots.

Disclosed is a method of locking a bayonet mount, which may comprise: (a) mating a hollow cylindrical male mounting member having a plurality of mounting pins with at least one pair of mounting pins having adjacent apertures to a female mounting member defining a plurality of slots having a circumferentially extending pin retention portion so that each mounting pin is positioned within a pin retention portion and each aperture is positioned adjacent an open portion of a circumferentially extending pin retention portion of a slot; and (b) locking the bayonet mount by positioning a locking collar having an arcuate body and a pair of radially extending locking pins inside the hollow male mounting member so that each of said locking pins extends radially outward through an aperture and an adjacent slot.

Disclosed is a disc and wheel assembly, which may comprise: (a) a disc comprising: a mount with a circumferential and radially outwardly facing first mounting surface, a plurality of radially outwardly extending mounting pins spaced about a circumference of the first mounting surface; (b) an auxiliary wheel comprising: a circumferential radially inward facing second mounting surface defining a plurality of mounting slots arranged about a circumference of the second mounting surface, each of the mounting slots comprising an open and axially extending entry portion and a closed and circumferentially extending retaining portion; wherein each of the mounting pins is disposed in one of the mounting slots.

Disclosed is a method of making a disc and wheel assembly. The disc may comprise: a mount with a circumferential and radially outwardly facing first mounting surface, a plurality of radially outwardly extending mounting pins spaced about a circumference of the first mounting surface.

The auxiliary wheel may comprise: a circumferential radially inward facing second mounting surface defining a plurality of mounting slots arranged about a circumference of the second mounting surface, each of the mounting slots comprising an open and axially extending entry portion and a closed and circumferentially extending retaining portion.

The method may comprise disposing each of the mounting pins in one of the mounting slots.

Disclosed is a disc and wheel assembly, which may comprise: (a) a disc comprising: a mount with a circumferential first mounting surface, (b) an auxiliary wheel comprising: a circumferential second mounting surface.

One of the disc and the auxiliary wheel may comprise a plurality of radially outwardly facing mounting pins and the other of the disc and the auxiliary wheel may define a plurality of mounting slots. Each of the mounting pins may be disposed in one of the mounting slots.

Additional disclosed systems, methods, and techniques appear in the Figures and Detailed Description.

BRIEF DESCRIPTION OF THE FIGURES

FIG. 5 only includes an upper profile of the turbine disc and omits the mirrored, but otherwise identical lower profile of the turbine disc.

FIG. 8 is an enlarged fragmentary isometric view of a second set of modifications to the turbine assembly, which includes the collar.

FIG. 12A is the view of FIG. 12 with a schematically illustrated collar.

FIG. 13 shows the auxiliary wheel and turbine tabs of the turbine disc.

FIGS. 16A, 16B, and 16C are schematic front plan views of various embodiments of teeth and channels of the auxiliary wheel.

FIG. 17 is a schematic view of a prior art gas turbine engine.

DETAILED DESCRIPTION

Figure 1:
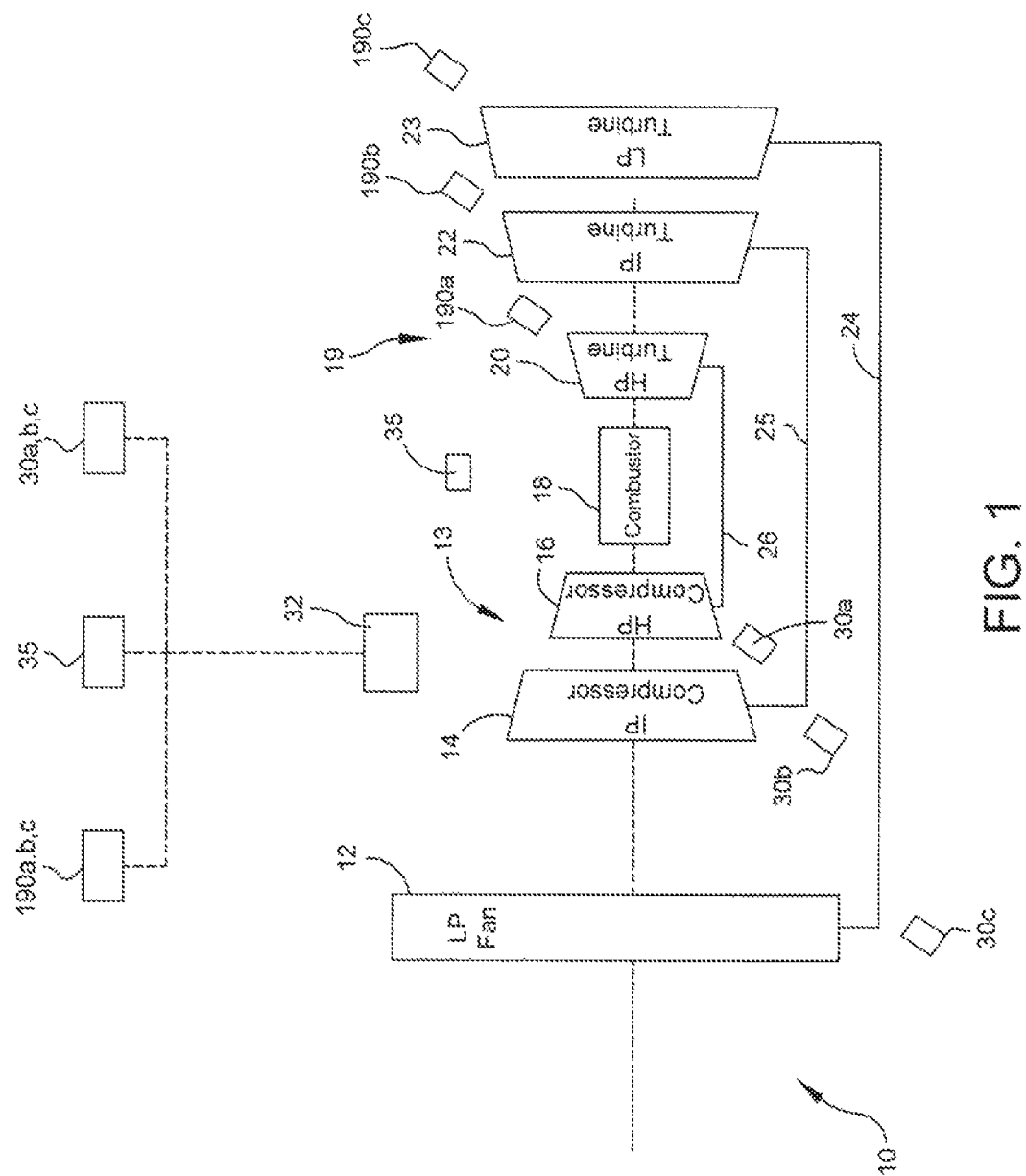
FIG. 1 is a schematic of an aircraft engine.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure.

Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

FIG. 17 shows a prior art system 1 for sensing speed of a driveshaft. System 1 includes a compressor 2 coupled with a turbine 3 via a draftshaft 4. Draftshaft 4 defines a plurality of circumferentially arranged notches 5. Controller 8 estimates the speed of turbine 3 based on the rate at which notches 5 pass by sensor 7.

Because notches 5 are upstream of turbine 3, system 1 can only be used to estimate turbine speed if the portion of driveshaft 4 between notches 5 and turbine 3 is intact. If a break occurs in this portion of driveshaft 4 (e.g., at region 6), then turbine 3 may rotate at a different speed than notches 5 of driveshaft 4. Because the driveshaft notches 5 may continue to rotate after a break in region 6, controller 8 may not identify an anomaly until after turbine 3 has attained an uncontainable speed.

FIG. 1 is a schematic representation of a three-spool gas turbine engine 10 for an aircraft (not shown). Each spool or driveshaft mechanically couples one of a fan and compressor to a turbine. The spools are coaxial and thus some spools may be hollow to enclose one or more other spools. When engine 10 is active, airflow is from left to right. With respect to FIGS. 1 to 5, a given component is "downstream" of components to its left and "upstream" of components to its right.

Engine 10 includes a low-pressure (LP) fan 12, compressor components 13 including an intermediate-pressure (IP) compressor 14, a high-pressure (HP) compressor 16, a combustor 18, and turbine components 19. Turbine components 19 include a HP turbine assembly 20, an IP turbine assembly 22, and a LP turbine assembly 23. LP spool or driveshaft 24 links LP turbine assembly 23 with LP fan 12. IP spool or driveshaft 25 links IP turbine assembly 22 with IP compressor 14. HP spool or driveshaft 26 links HP turbine assembly 20 with HP compressor 16.

Upon assembly, engine 10 may be mounted on an aircraft (not shown). Although not shown, engine 10 may include an outer housing that is static with respect to the wings and fuselage. The outer housing may be hollow to circumferentially enclose at least LP fan 12, IP compressor 14, HP compressor 16, combustor 18, HP turbine 20, IP turbine 22, LP turbine 23, spools 24 to 26, speed sensors 30a to 30c, and speed probes 190a to 190c.

Engine 10 may include a digital engine controller 32 with a processor and memory. Controller 32 is "configured" to perform a disclosed function or operation at least when the memory of controller 32 stores code embodying the disclosed function or operation and the processor is capable of executing the stored code. Controller 32 may correspond to a plurality of discrete, but connected controllers each having one or more processors and memory.

Controller 32 may be in communication with speed sensors 30a to 30c, speed probes 190a to 190c, and with fuel valve 35. The combination of controller 32, speed sensors 30a to 30c, and speed probes 190a to 190c is called a speed sensing system. No substantive difference is necessarily implied by the term "probe" versus "sensor". Fuel valve 35 regulates fuel supplied to combustor 18. Although not shown, fuel valve 35 may include a plurality of valves connected in series and/or parallel. Controller 32 is configured to instruct fuel valve 35 to close, thus terminating fuel supply to engine 10. Speed sensors 30a to 30c and speed probes 190a to 190c are static or fixed with respect to the engine housing (not shown).

Figure 2:
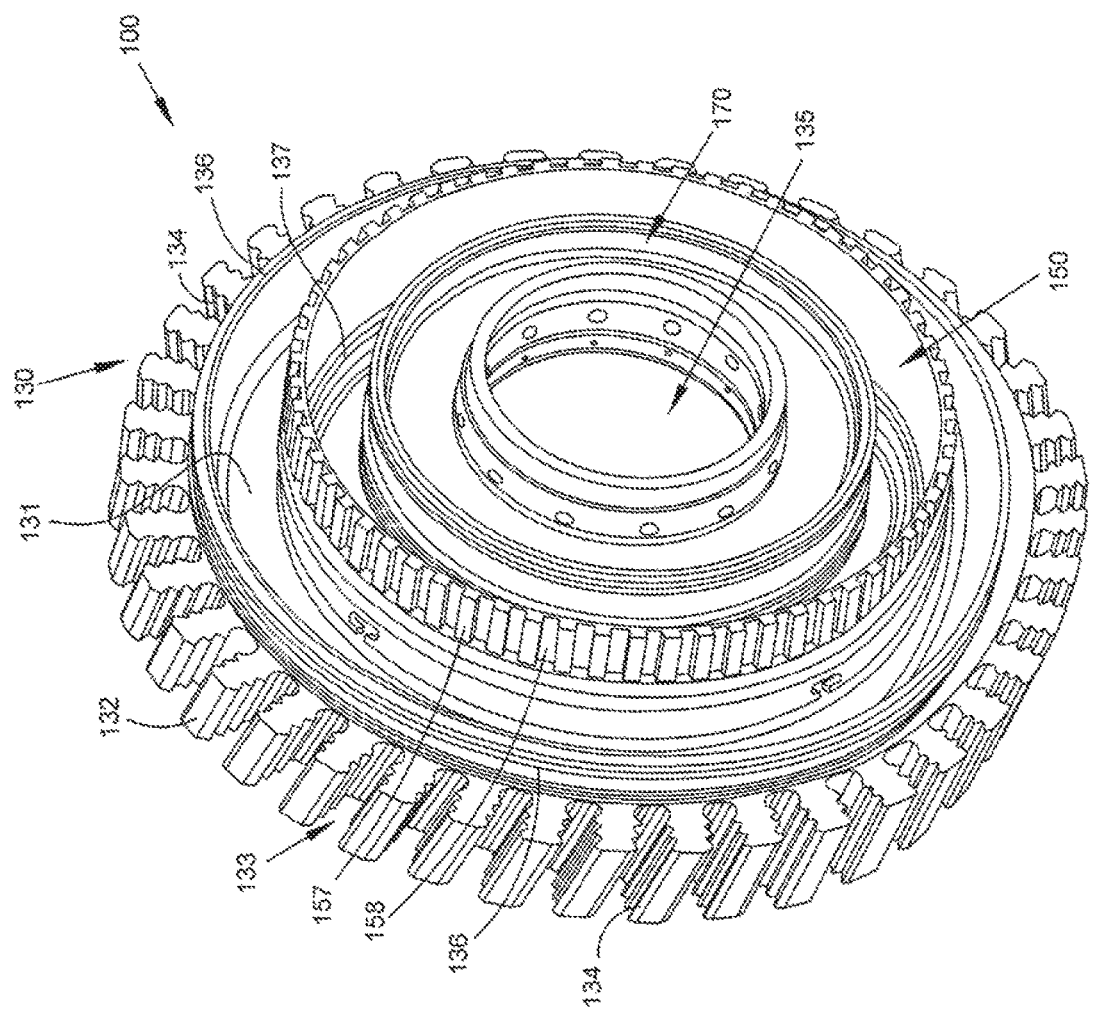
FIG. 2 is an isometric view of a turbine assembly of the aircraft engine.
Figure 2A:
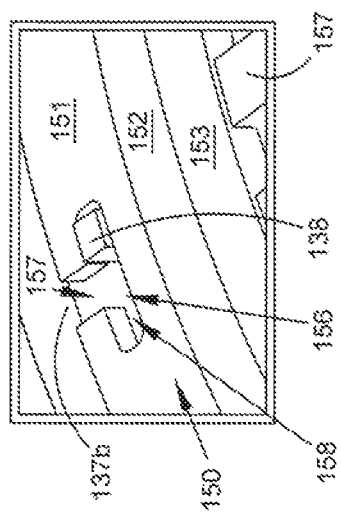
FIG. 2A is an enlarged fragmentary isometric view of the turbine assembly and shows a tab or bayonet a turbine disc extending into an aperture of an auxiliary wheel.
Figure 2B:
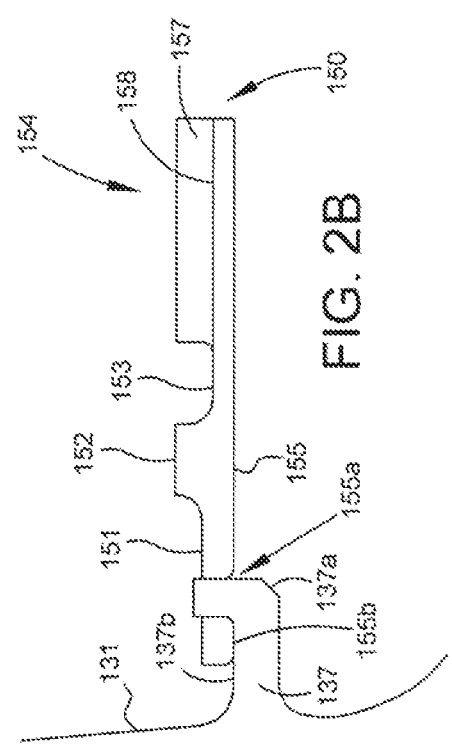
FIG. 2B is a schematic and fragmentary cross sectional side elevational profile of the turbine disc and the auxiliary wheel.
Figure 3:
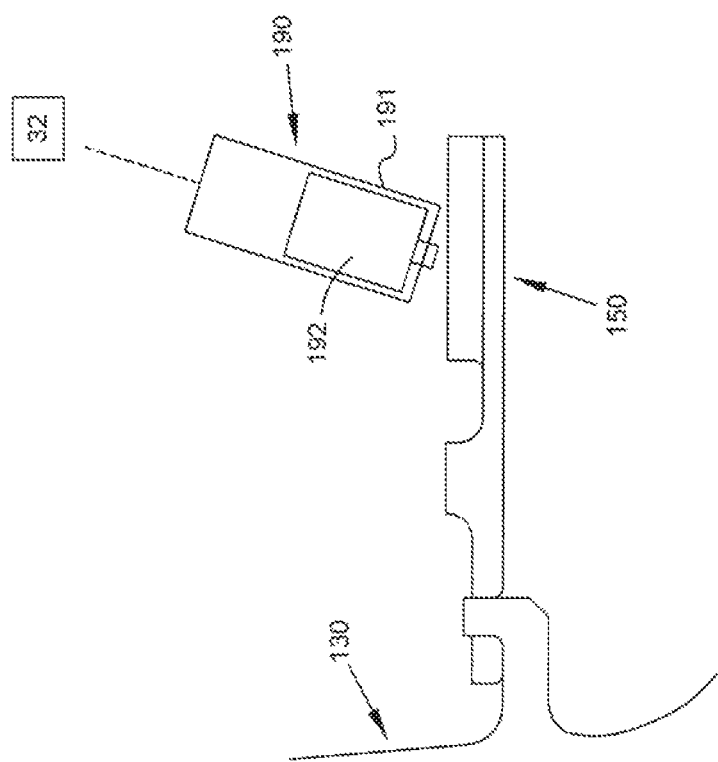
FIG. 3 adds a schematically illustrated speed probe to the view shown in FIG. 2B.

FIGS. 2, 2A, and 2B show a turbine assembly 100 (also called a rotor assembly, a disc assembly, or a wheel assembly). Turbine assembly 100 may be illustrative of one or all of HP turbine assembly 20, IP turbine assembly 22, and LP turbine assembly 23.

Turbine assembly 100 may be applied to a range of other gas turbine engines other than engine 10 of FIG. 1. For example, turbine assembly 100 may be applied in an industrial power plant. And even when turbine assembly 100 is applied to an aircraft engine, the aircraft engine may include only some of the features of shown in FIG. 1. Put differently, the arrangement of FIG. 1 only represents one of many different potential applications of the features disclosed herein.

Turbine assembly 100 includes a turbine disc 130 (also called a turbine, a base disc, a first disc, a turbine wheel, a base wheel, and a first wheel), an auxiliary wheel 150 (also called an intermediate disc, an auxiliary disc, a target disc, a speed target disc, a mounted disc, a second disc, a target wheel, an intermediate wheel, a speed target wheel, a mounted wheel, and a second wheel), and a clamping assembly 170 comprising one or more clamping discs.

In one embodiment, turbine disc 130 converts airflow into mechanical energy; auxiliary wheel 150 serves as a target for a speed probe 190; and clamping assembly 170 links turbine assembly 100 with a spool or driveshaft, such as one of HP spool 26, IP spool 25, and LP spool 24. When clamping assembly 170 is engaged with the spool or driveshaft, turbine assembly 100 is fixed with respect to the spool or driveshaft, such that the pair rotates as a unit. With reference to FIG. 2, airflow is from left to right such that turbine disc 130 is upstream of auxiliary wheel 150.

Figure 5:
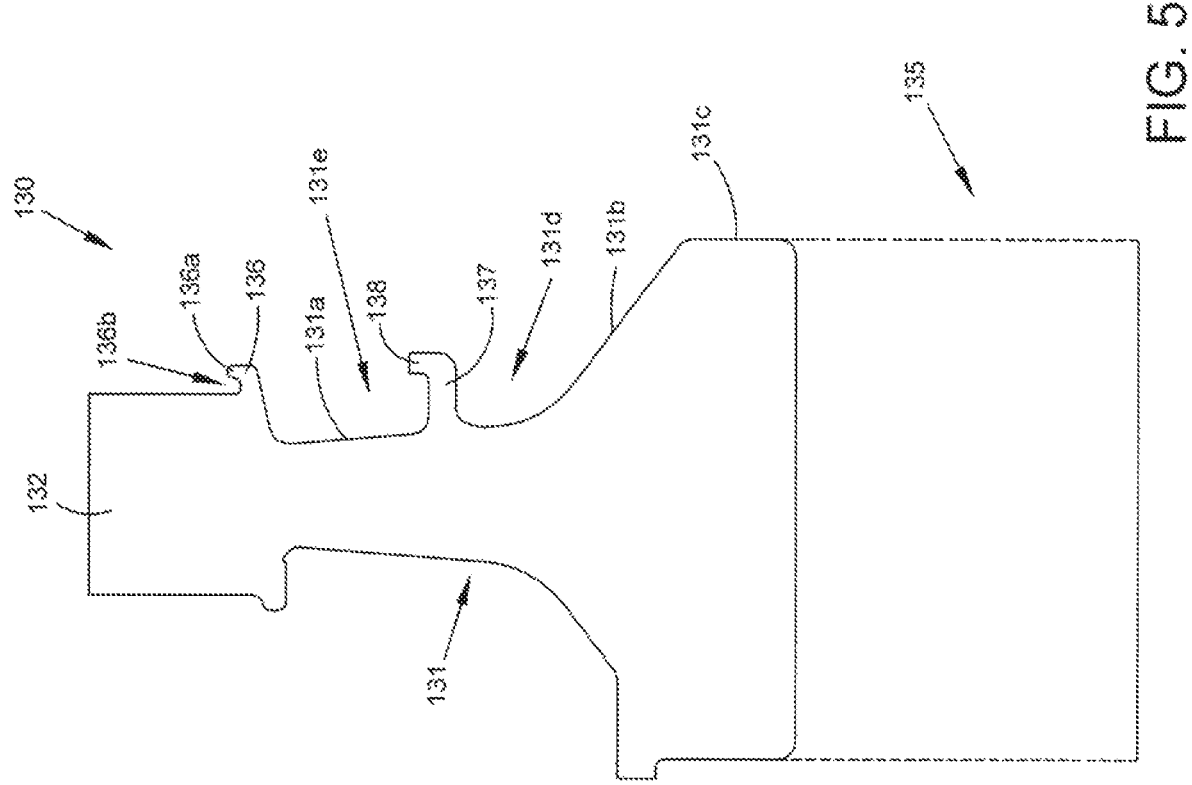
FIG. 5 is a cross sectional side elevational profile of the turbine disc.

Turbine disc 130 includes an annular base 131, which defines a cylindrical central turbine disc aperture 135 through which the spool or driveshaft extends to inner circumferentially engage clamping assembly 170. As shown in FIG. 5, base 131 includes an axially thin portion 131*a*, an axially sloping portion 131*b*, and an axially thick portion 131*c*. Blade grips 132 radially project from base 131 to define blade slots 133. Each grip 132 includes circumferentially extending ridges or projections 134, which fit into corresponding and inverse grooves defined in turbine blades (not shown). Upon final assembly, the turbine blades (not shown) are secured into each of the blade slots 133 such that the ridges 134 fit into the inverse grooves of the turbine blades (not shown), thereby discouraging radial movement of the turbine blades with respect to turbine disc 130.

A circumferential member 136 (also called a projection) axially projects from base 131 to at least partially circumferentially enclose auxiliary wheel 150. If auxiliary wheel 150 were to separate from turbine disc 130, member 136 may at least partially impede auxiliary wheel 150 from radially launching toward the engine housing (not shown). The circumferential inner face of member 136 may be smooth, while the circumferential outer face of member 136 may be ridged. As shown in FIG. 5, member 136 may include a radially projecting annular lip 136*a* defining a circumferential pocket 136*b*. Member 136 is coaxial with turbine disc aperture 135.

Figure 4:
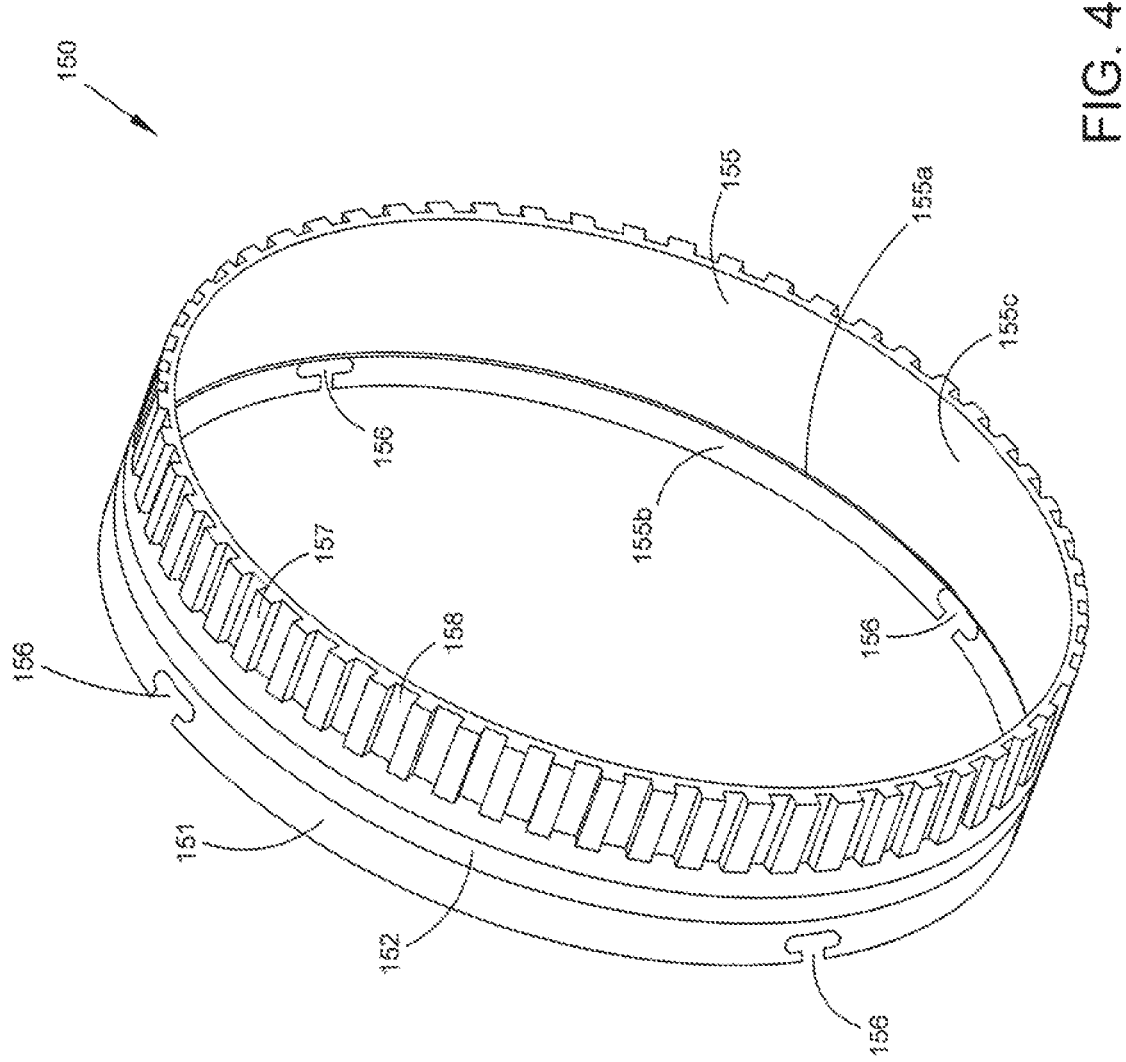
FIG. 4 is an isometric view of the auxiliary wheel in isolation

A circumferential mount 137 (also called a male mounting member) axially projects from base 131 to at least partially circumferentially enclose clamping assembly 170. As shown in FIG. 5, mount 137 and axially sloping portion 131*b* of base 131 define a first C-shaped recess 131*d* when turbine disc 130 is viewed from a cross sectional side elevational perspective. Base 131 defines a second C-shaped recess 131*e* radially outward of first C-shaped recess 131*d*. Mount 137 may axially extend a lesser distance than member 136, as shown in FIG. 2. As shown in FIGS. 2B and 4, mount 137 and auxiliary wheel 150 may axially overlap so that a first portion 155*b* of the inner surface 155 of auxiliary wheel 150 engages mount 137, while a second portion 155*c* of the inner surface of auxiliary wheel 150 extends axially beyond mount 137. As shown in FIG. 2B, an axially downstream end of mount 137 is circumferentially chamfered 137*a*. Mount 137 is coaxial with turbine disc aperture 135.

Tabs 138 (also called turbine tabs, pins, and mounting pins) radially outwardly project from the outer surface of mount 137. Tabs 138 may be equally spaced about the circumference of mount 137 (e.g., three tabs at 120 degree intervals; four tabs at 90 degree intervals, as shown in FIG. 4). As shown in FIG. 2A, tabs 138 radially project a distance greater than a radial thickness of auxiliary wheel 150. Each tab 138 may be box-shaped. Although not shown, each tab 138 may correspond to a plurality (e.g., two) of tabs. Each plurality of tabs may simultaneously fit within a single aperture 156.

Clamping assembly 170 is coaxial with turbine disc aperture 135 and includes one or more clamping discs. Clamping assembly 170 is fixed to base 131 (e.g., bolted) and axially extends therefrom. A portion of clamping assembly 170 may be disposed within turbine disc aperture 135. As shown in FIG. 2, clamping assembly 170 is radially spaced from auxiliary wheel 150.

As previously discussed, a spool or driveshaft (e.g., HP spool 26, IP spool 25, LP spool 24) axially extends through turbine disc aperture 135 to engage clamping assembly 170 (e.g., via bolts, via teeth, via splines, etc.). Both clamping assembly 170 and auxiliary wheel 150 rotate as a unit with turbine disc 130. Thus, clamping assembly 170 transfers rotational torque from turbine disc 130 to the spool or driveshaft, causing the same to rotate with turbine disc 130. The spool or driveshaft transmits the torque upstream to rotationally power the fan or compressor component mechanically linked with the spool or driveshaft. The spool or driveshaft may include a gearbox or transmission (not shown) to enable turbine disc 130 to rotate at a different speed than the linked compressor component or fan.

Auxiliary wheel 150 is secured to mounting disc 137 and coaxial with turbine disc aperture 135. One purpose of auxiliary wheel 150 may be to present a speed sensor target wheel having an alternating series of teeth (also called first features) and channels (also called second channels) to probe 190, thus enabling controller 32 to sense a rotational speed of turbine disc 130. Both the teeth and channels may be magnetic and probe 190 may include a magnet.

Installation of auxiliary wheel 150 as a discrete component (i.e., non-integral with turbine disc 130) is desirable because turbine disc 130 typically does not possess magnetic properties. Due to the high temperature of combustion products flowing through engine 10, turbine disc 130 is often formed from a nickel alloy, such as Inconel, which is an austenitic nickel-chromium-based superalloy.

Magnetic generally means strongly attracted to a magnet's field. Thus, magnetic materials are typically either ferromagnetic or ferrimagnetic. Non-magnetic materials are typically paramagnetic, antiferromagnetic, or diamagnetic. Anti-magnetic materials are typically diamagnetic. Thus, some non-magnetic materials may also be anti-magnetic. According to various embodiments, turbine disc 130 and/or clamping assembly 170 are non-magnetic or anti-magnetic.

Referring to FIGS. 2A and 2B, auxiliary wheel 150 includes a base portion 151 (also called a female mounting member), a balance land 152, a buffer portion 153, and a target portion 154. Radially inner surface 155 is smooth and circumferentially arced. Inner surface 155 (also called a radially inward facing mounting surface) bears on mount 137 to form an interference fit. Auxiliary wheel 150 is coaxial with turbine disc aperture 135.

As shown in FIG. 4, inner surface 155 defines a circumferential notch or channel 155*a*, which divides inner surface into a first axial portion 155*b* and a second axial portion 155*c*. As shown in FIG. 2B, upon assembly with turbine disc 130, first axial portion 155*b*, but not second axial portion 155*c*, bears on mount 137. All of first axial portion 155*b* may experience an interference fit against mount 137. Apertures 156 (discussed below) divide axial portion 155*b* into four distinct regions.

Figure 8A:
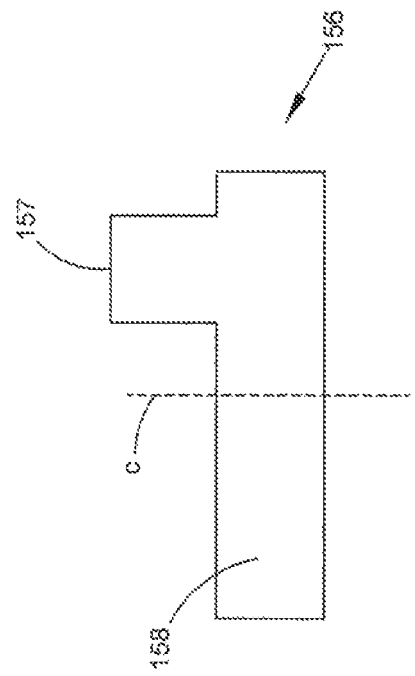
FIGS. 8A and 8B are schematic top plan views of embodiments of an aperture.
Figure 8B:
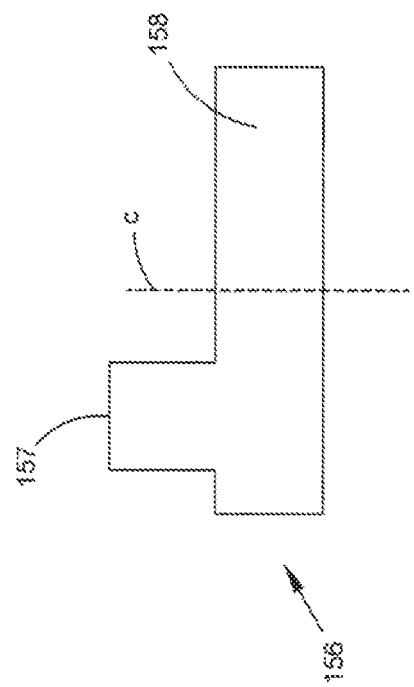

Base portion 151 defines a plurality of "T" shaped apertures 156 (also called slots or mounting slots). Alternatively, and as shown in FIGS. 8A and 8B, apertures 156 may be L-shaped or offset T-shaped. Each aperture 156 includes a box-shaped entry aperture or slot 157 (also called an open axially extending portion) leading to a box-shaped retaining aperture or slot 158 (also called a locking aperture or slot or a closed circumferentially extending portion). As shown in FIG. 2A, retaining aperture 158 may have rounded corners. Retaining aperture 158 includes a middle (not labeled) disposed between two ends (not labeled). The middle is coaxial with entry aperture 157.

When viewed from a top plan perspective, each end includes three sides. Although not shown, retaining aperture 158 may only include one end. By virtue of bearing on tab 138, two of the three sides oppose axial motion of auxiliary wheel 150 with respect to turbine disc 130. By virtue of bearing on tab 138, the other of the three sides opposes clockwise or counterclockwise rotation of auxiliary wheel 150 with respect to turbine disc 130. Apertures 156 may axially terminate at notch 155a. Put differently, at least a portion of each aperture 156 may be co-circumferential with notch 155a.

In the depicted embodiment, retaining aperture 158 advantageously includes two ends. As such, if auxiliary wheel 150 somehow rotates with respect to turbine disc 130, then tab 138 is likely to slide from one end of retaining aperture 138 to the other end of retaining aperture 138, thus maintaining the axial integrity of auxiliary wheel 150 with respect to turbine disc 130. Apertures 156 may be sized for an interference fit with respect to tabs 138 such that each tab 138 must be forced through each entry aperture 157 and further forced into the end of retaining aperture 138. Alternatively, and as discussed below, auxiliary wheel 150 may be heated and prior to assembly with turbine disc 130, thus expanding apertures 156 to enable a non-forced slide of tabs 138 through aperture 158. Upon cooling, entry apertures 157 may contract to disable movement of tabs 138 therethrough while retaining apertures 138 cool to tightly bear on tabs 138.

As shown in FIG. 2A, each tab 138 has a radial thickness or height greater than the radial thickness of base portion 151. Base portion 151 has a constant radial thickness, except for the part of base portion 151 co-circumferential with notch 155a.

Base portion 151 axially arcs into balance land 152. When auxiliary wheel 150 is manufactured, balance land 152 has a radial thickness greater than the radial thicknesses of base portion 151 and buffer portion 153. At this time, balance land 152 may have a radial thickness equal to a radial thickness of one of the teeth of target portion 154. Upon initial production, balance land 152 is smooth and circumferentially arced. When viewed from a cross sectional side elevational perspective, as shown in FIG. 2B, the top surface of balance land 152 is flat and balance land 152 is plateau shaped. As with all features disclosed herein, target portion 154 is optional. As such, some embodiments of auxiliary wheel 150 lack teeth 157 and channels 158.

Figure 15:
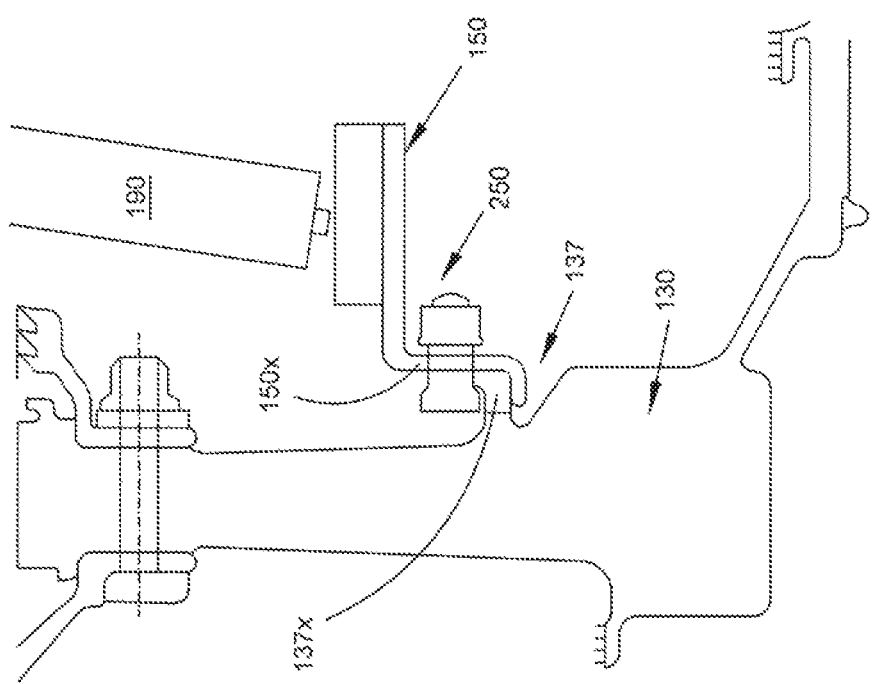
FIG. 15 is a schematic and cross sectional side elevational view of the turbine assembly where the auxiliary wheel is bolted to the mount.

Alternatively or in addition to apertures 156 and tabs 138, auxiliary wheel 150 may be bolted to turbine disc 130. For example, and as shown in schematically in FIG. 15, mount 137 may include an annular and radially outward extending protrusion 137x and auxiliary wheel 150 may include an annular and radially inwardly extending protrusion 150x. A plurality of circumferentially spaced bolt assemblies 250 may link outward protrusion 137x with inward protrusion 150x. Each bolt assembly 250 may include one or more balance weights (discussed below).

After production, auxiliary wheel 150 is installed on turbine disc 130. An interference fit is created between auxiliary wheel 150 and mount 137 of turbine disc 130. Thus, prior to assembly, the outer diameter of mount 137 may exceed the inner diameter of auxiliary wheel 150. To generate the interference fit, a thermal fitting method may be applied (e.g., a shrink fit where auxiliary wheel 150 is heated, placed on mount 137, then allowed to cool; an expansion fit where mount 137 is chilled, auxiliary wheel 150 is placed on mount 137, then mount 137 is allowed to heat up) or a force fitting method may be applied. As with all methods disclosed herein, these installation techniques are only examples. Any suitable installation or mounting method may be applied.

Upon assembly, the blades of turbine disc 130 are attached. Clamping assembly 170 is connected to a driveshaft and the driveshaft is rotated. While the driveshaft is rotated, the balance of turbine assembly 100 is tested and a center of rotation of turbine assembly 100 is determined.

Ideally, the center of rotation of turbine assembly 100 is coaxial with turbine disc aperture 135 (i.e., on the central axis of turbine disc 130). If the center of rotation of turbine assembly 100 is noncoaxial with turbine disc aperture 135, then turbine assembly 100 may wobble, shake, or vibrate during rotation.

To remedy this defect, balance land 152 is shaved, ground, or machined (i.e., material is subtracted from balance land 152) at one or more locations based on the actual center of rotation of turbine assembly 100. Alternatively or in addition, auxiliary wheel 150 is rotated with respect to turbine disc 130 (by moving tabs 138 within apertures 156). One or both of these steps are repeated until center of rotation of turbine assembly 100 is coaxial (e.g., approximately coaxial) with turbine disc aperture 135. If bolt assemblies 250 are present, then the same subtractive process may be applied to the weights of the bolt assemblies 250. In addition, the weights of the bolt assemblies 250 may be swapped out to improve balance.

Turbine disc 130 is a critical component. As such, any deformations of turbine disc 130 require re-peening. Because auxiliary wheel 150 is non-integral with turbine disc 130, and thus a non-critical component, no re-peening of turbine disc 130 is required after material is removed or subtracted from balance land 152 via the above-described shaving, grinding, or machining processes. As is known in the art, peening often includes shot peening, which is a cold work finishing process that prevents fatigue and stress failures in mechanical parts. By the time turbine assembly 100 is used in an aircraft, balance land 152 may have an irregular and varying (i.e., non-uniform) radial thickness due to the removal or subtraction of material.

Balance land 152 axially arcs into buffer portion 153, which has a radial thickness less than the radial thicknesses of base portion 151 and balance land portion 152. Buffer portion 153 may have a radial thickness equal to the channels defined between consecutive teeth of target portion 154.

Target portion 154 includes teeth 157. Consecutive teeth 157 define channels 158. Teeth 157 are radially extending protrusions. As shown in FIG. 2B, each tooth 157 may have an axially flat top surface when auxiliary wheel 150 is viewed from a cross sectional side elevational perspective. Although FIG. 2 shows teeth 157 being box-shaped, other shapes are suitable. Each channel 158 is box-shaped. Each channel 158 may have the same (e.g., approximately the same) circumferential width as each tooth 157. Outer surface 137b (also called an outward facing mounting surface) may represent the bottom surface of each channel 158. Every tooth 157 has the same (e.g., approximately the same) volume. Every channel 158 has the same (e.g., approximately the same) volume. The volume of each channel 158 may be the same (e.g., approximately the same) as the volume of each tooth 157.

Figure 16B:
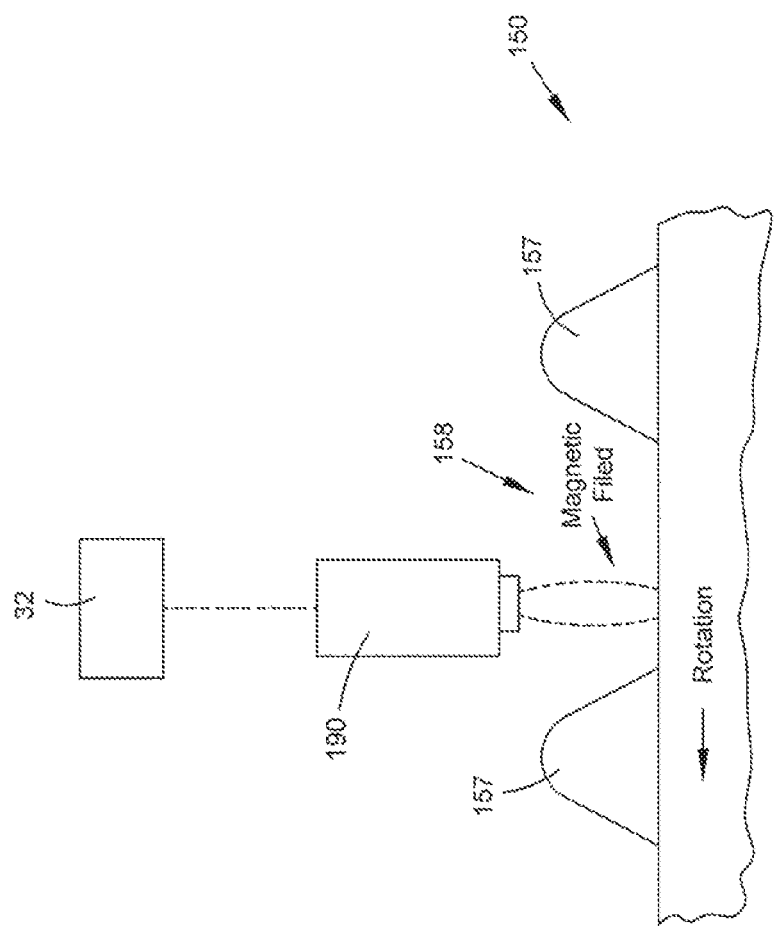
Figure 16C:
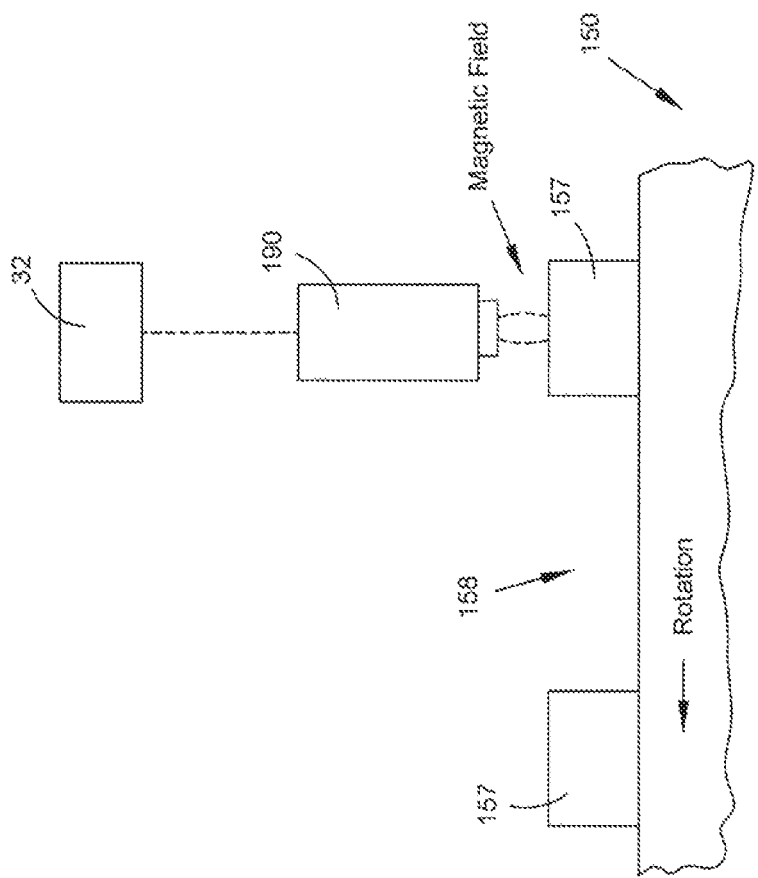
Figure 117:
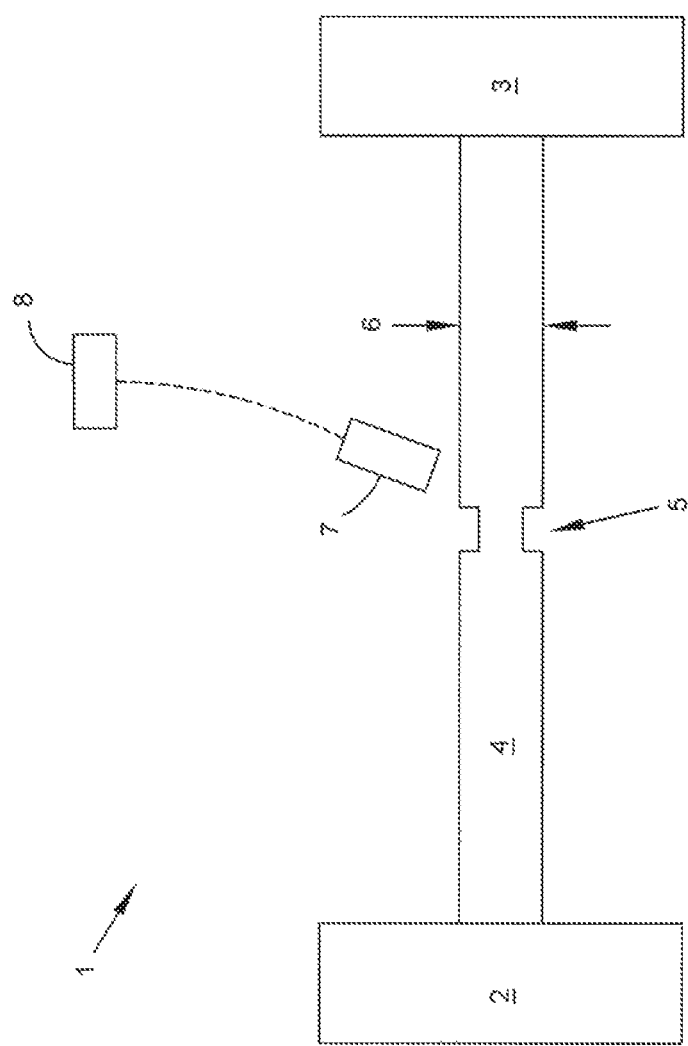

FIGS. 16A to 16C show various embodiments of teeth 157 and channels 158 are taken from a schematic and fragmentary front plan perspective. Although teeth 157 and channels 158 have been described as being box-shaped (FIG. 16C), teeth 157 and channels 158 may be trapezoidal (FIGS. 16A and 16B). In FIGS. 16A and 16C, the upper radial faces of teeth 157 are flat. In FIG. 16B, the upper radial faces of teeth 157 are arced.

In the embodiment of FIG. 2, at least the top surface of each tooth 157 is magnetic and at least the bottom surface of each channel 158 (visible in FIG. 2) is also magnetic. According to other embodiments, the bottom surface of each channel 158 is non-magnetic or anti-magnetic while the top surface of each tooth 157 is magnetic. According to other embodiments, at least the top surface of each tooth 157 is non-magnetic or anti-magnetic and at least the bottom surface of each channel 158 is magnetic.

Auxiliary wheel 150 may be made from a magnetic material such as steel. Channels 158 may then be demagnetized. For example, channels 158 may be covered with a non-magnetic or anti-magnetic coating (e.g., a paint or a film). Alternatively, auxiliary wheel 150 may be made from a non-magnetic or anti-magnetic material and the top surfaces of teeth 157 may be covered with a magnetic coating. These processes may be reversed if channels 158 are magnetic and teeth 157 are non-magnetic or anti-magnetic.

Figure 6:
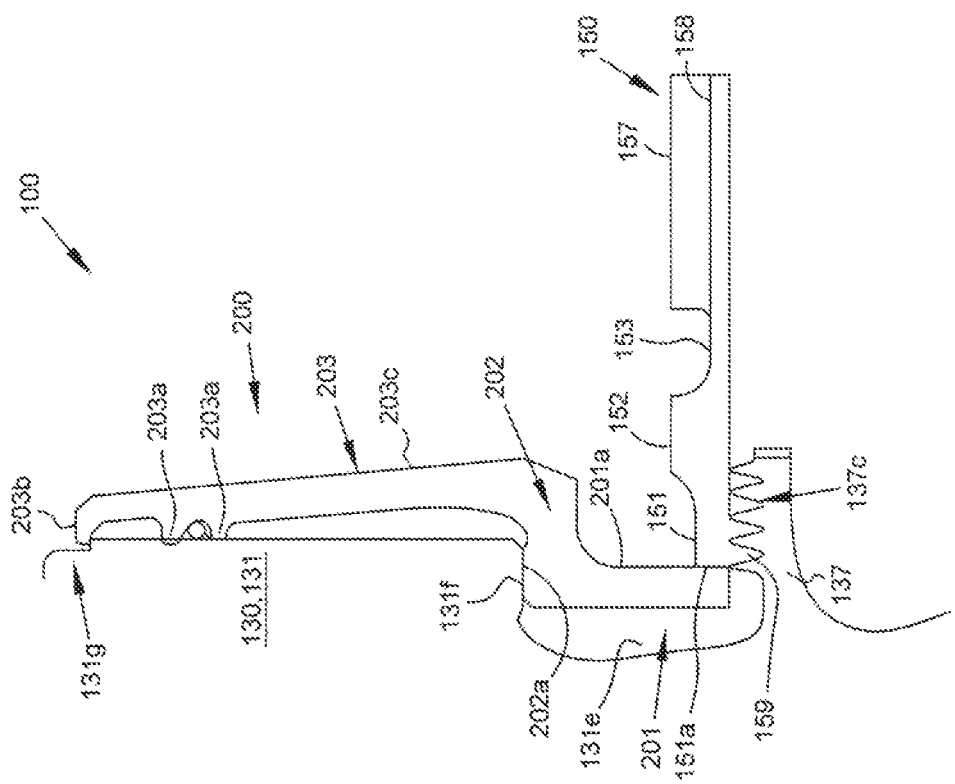
FIG. 6 is a fragmentary cross sectional side elevational profile of a first set of modifications to the turbine assembly, which may include a coverplate.

FIG. 6 illustrates another embodiment. In FIG. 6, turbine disc 130 and auxiliary wheel 150 are arranged to accommodate an annular coverplate 200. Mount 137 includes a plurality of circumferentially extending buttress threads 137c. Auxiliary wheel 150 (which may be referred to as a spanner nut) includes a radially inward and circumferentially extending spanner nut portion 159. Buttress threads 137c and spanner nut portion 159 include teeth or ridges defining valleys or channels therebetween. The teeth or ridges of buttress threads 137c occupy the valleys or channels of spanner nut portion 159. The teeth or ridges of spanner nut portion 159 occupy the valleys or channels of buttress threads 137c.

Spanner nut portion 159 and buttress threads 137c enable auxiliary wheel 150 to be screwed onto mount 137. As such, rotation of auxiliary wheel 150 in one direction (e.g., clockwise), tightens auxiliary wheel 150 with respect to mount 137 by forcing auxiliary wheel 150 axially upstream. Rotation of auxiliary wheel 150 in an opposing direction (e.g., counter-clockwise), loosens auxiliary wheel 150 with respect to mount 137 by forcing auxiliary wheel 150 axially downstream. Coverplate 200 is loosely disposed about mount 137 before auxiliary wheel 150 is screwed onto turbine disc 130.

Coverplate 200 (also called cover disc) is disc shaped and defines a central aperture through which mount 137 extends. Coverplate 200 is coaxial with turbine disc 130. Coverplate 200 may also be segmented. In the radial dimension, coverplate 200 includes a leg portion 201, a transition portion 202, and a covering portion 203. Leg portion 201 includes a flat and ring-shaped axially downstream first engaging surface 201a.

When auxiliary wheel 150 is sufficiently tight, a ring shaped and flat annular end 151a of target disc base portion 151 compressively bears against first engaging surface 201a. Annular end 151 may compress against first engaging surface 201a about its entire circumference. Transition portion 202 includes an arced and smooth radially outward second engaging surface 202a.

When auxiliary wheel 150 is sufficiently tight, an arced inner annular surface 131f compressively bears on second engaging surface 202a. inner annular surface 131 may compress against second engaging surface 202a about its entire circumference. Annular end 151a of auxiliary wheel 150 may be perpendicular (e.g., approximately perpendicular) to annular surface 131f of turbine disc 130. This geometry discourages coverplate 200 from both tipping and axially slipping with respect to turbine disc 130 during rotation.

Turbine disc 130 defines an annular recess 131e, which accommodates leg portion 201 and at least a part of transition portion 202. When viewed in cross section, as shown in FIG. 6, annular recess 131e is C-shaped. As shown in FIG. 6, only second engaging surface 202a engages the surfaces defining annular recess 131e. As such, a gap separates leg portion 201 from turbine disc 130.

Cover portion 203 includes a plurality of annular protrusions 203a, which engage turbine disc 130. Cover portion 203 includes an annular lip 203b, which axially extends into an annular shelf recess 131g defined by turbine disc 130. Shelf recess 131g of FIG. 6 may correspond to circumferential pocket 136b of FIG. 5.

An axially downstream surface 203c of cover portion 203 is smooth and non-apertured to prevent debris and/or heat from reaching turbine disc 130. As shown in FIG. 6, auxiliary wheel 150 and coverplate 200 cover all axially downstream surfaces of turbine disc 130 from mount 137 to shelf recess 131g.

FIGS. 7 to 12 illustrate additional embodiments. Here, an omega-shaped collar 210 (also called a retainer, a retaining ring, and an anti-rotation ring) is applied to occupy the gap in retaining slot 158 to impede rotation of turbine tab 138 with respect to auxiliary wheel 150.

Figure 7:
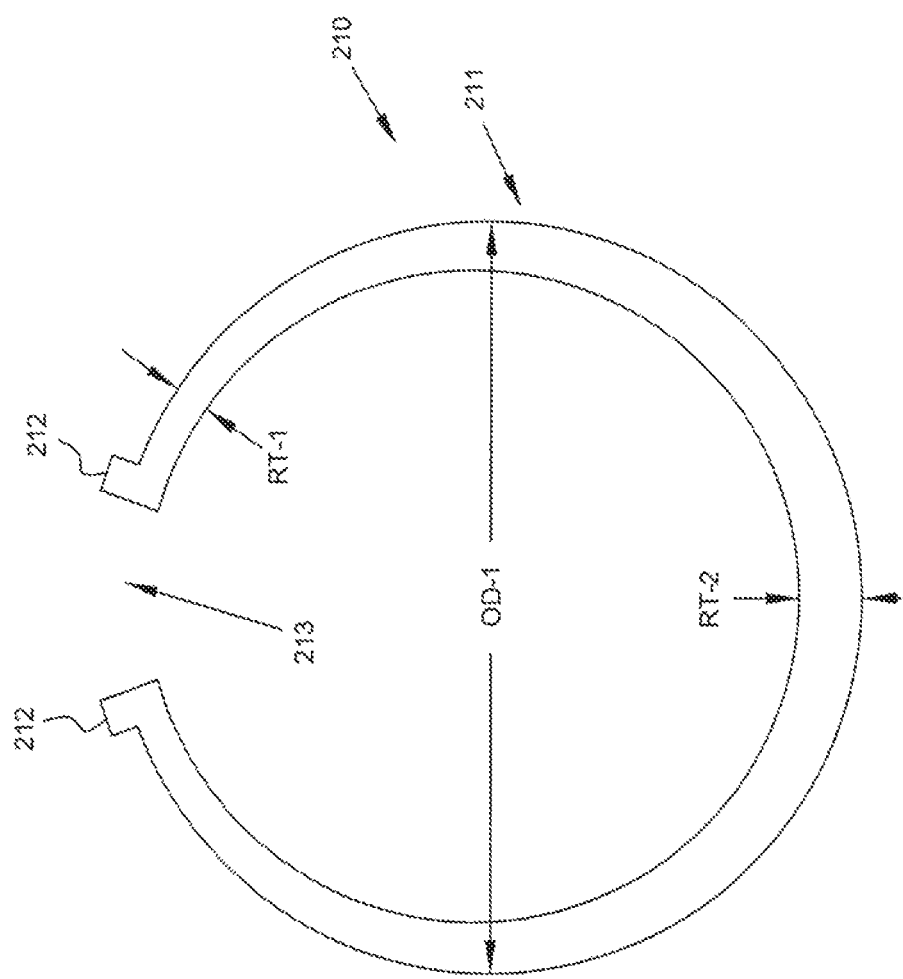
FIG. 7 is a front elevational view of a collar.

With reference to FIG. 7, collar 210 includes an annular, arcuate, or arced body 211 defining a gap 213. A pair of box-shaped collar tabs 212 (also called retainers or pins) radially protrude from body 211. Body 211 has a constant axial thickness, but a perpetually varying radial thickness that is thinnest (RT-1) directly adjacent collar tabs 212 and thickest (RT-2) at a midpoint of body 211. The thicker radial thickness RT-2 supports rotational balance by compensating for the missing material at gap 213. As shown in FIG. 8, each collar tab 212 may the same the axial thickness as turbine tab 138.

With reference to FIG. 8, collar tabs 212 extend through retaining slot 158 to crowd turbine tab 138. By being positioned in the gap in retaining slot 158, collar tabs 212 impede turbine tab 138 from rotating with respect to auxiliary wheel 150. Although FIG. 8 shows minor spaces between turbine tab 138 and collar tabs 212, collar tabs 212 may be sized to compressively bear on the transverse surfaces of turbine tab 138.

Once turbine tab 138 is in place, axial movement of turbine tab 138 through entry slot 157 may be accomplished via any of the above-described methods (e.g., shrink or expansion fitting). Alternatively or in addition, entry slot 157 may be offset with respect to an axial centerline C of retaining slot 158, as schematically shown in FIGS. 8A and 8B, to define an L-shaped or offset T-shaped aperture 156. Because entry slot 157 is offset, turbine tab 138 cannot move axially upstream into entry slot 157 when collar tabs 212 are present.

Figure 9:
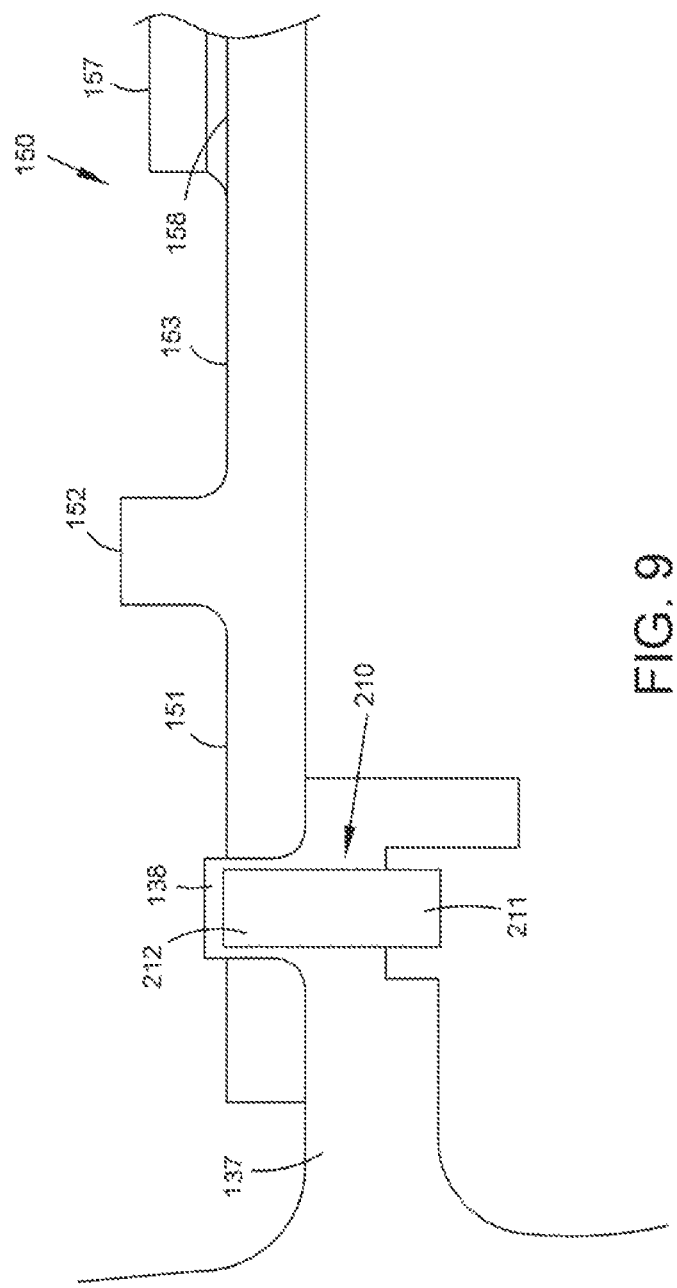
FIG. 9 is a schematic and fragmentary cross sectional side elevational profile of the turbine assembly with the second set of modifications.
Figure 10:
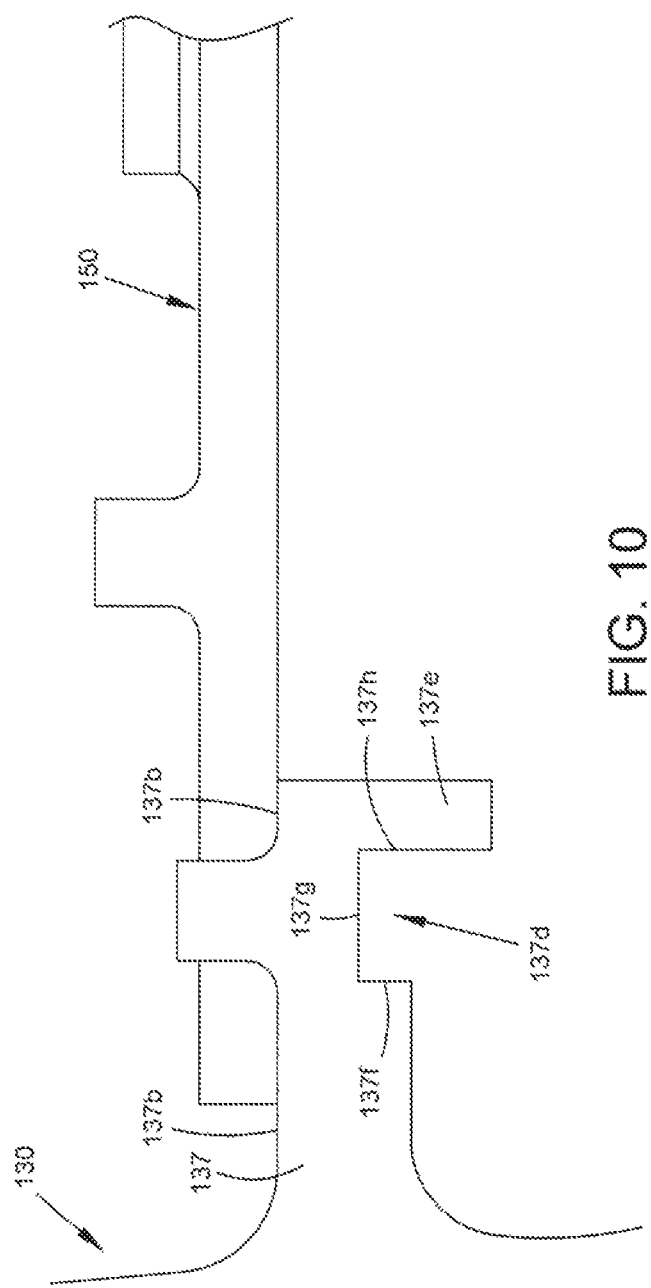
FIG. 10 is the view of FIG. 9 with the collar omitted.

As shown in FIGS. 8 and 9, mount 137 may define a groove 137d in which collar body 211 is disposed. Groove 137d discourages axial movement of collar 210 with respect to mount 137. Although FIG. 9 shows groove 137d being axially wider than collar 210, such an arrangement is purely exemplary. In practice, collar 210 may be sized to be in simultaneous axial contact with the surfaces 137f, 137g, 137h of mount 137 defining groove 137d. Radially inward projection 137e includes surface 137h.

Groove 137d is annular. Groove 137d may be defined in the complete inner circumference of mount 137. As shown in FIG. 7, collar 210 has a first transverse outer diameter, OD-1 (although the outer circumference of collar body 211 is not necessarily a perfect circle), upon manufacturing but prior to assembly with auxiliary wheel 150 and turbine disc 130. Upon assembly with auxiliary wheel 150 and turbine disc 130, aperture 156 of auxiliary wheel 150 causes the transverse outer diameter to shrink by pushing collar tabs 212 closer together (and thus narrowing gap 213). Because collar 210 is biased to its expanded original state of FIG. 7, collar 210 exists in a perpetual state of compression or interference upon installation. As a result, tabs 212 bear against the circumferential ends of retaining groove 158. Collar body 211 may be arcuate/annular/arced, but with a variable outer radius, prior to installation. Upon full installation, collar body 211 may have a constant (i.e., generally constant) outer radius and a variable inner radius. Collar 210 may be metallic and formed from rotor grade material such as Inconel 718.

Figure 11:
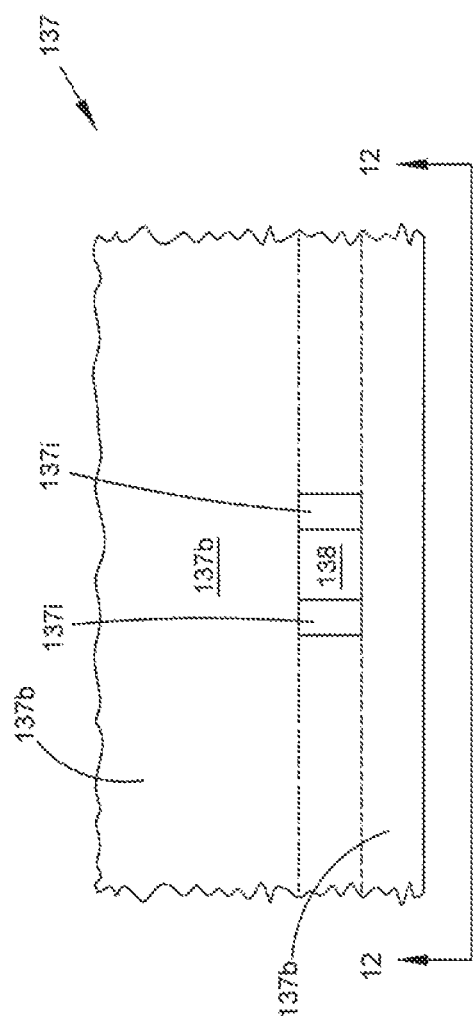
FIG. 11 is a schematic and fragmentary top plan view of the turbine disc according to the second set of modifications.
Figure 12:
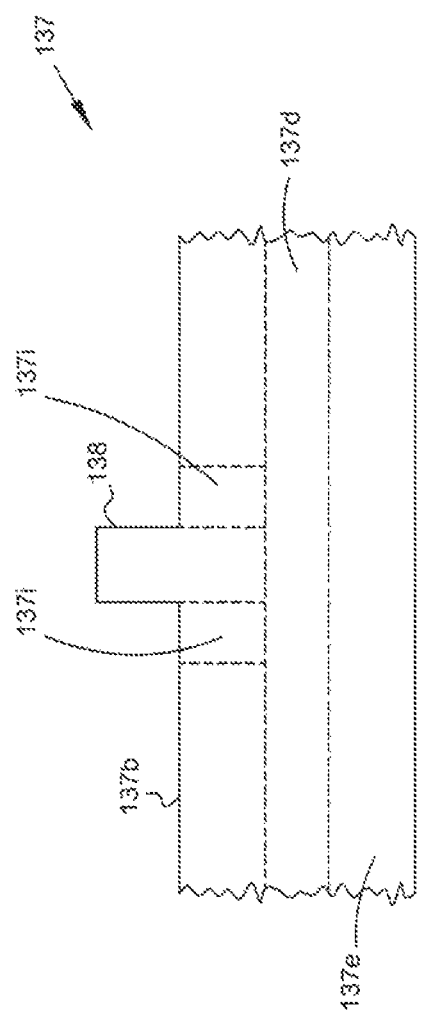
FIG. 12 is a schematic and fragmentary front plan view of the turbine disc of FIG. 11.

FIG. 11 is a schematic and fragmented top plan view of mount 137. FIG. 12 is a schematic and fragmented front plan view of mount 137 viewed from plane 12-12 of FIG. 11. For convenience and clarity, FIGS. 12 and 12A omit the arc of mount 137 and collar body 211. As shown in FIGS. 11 and 12, a pair of holes or apertures 137i meet groove 137d. This arrangement enables collar tabs 212 to reach turbine tab 138. Each hole 137i is directly circumferentially adjacent turbine tab 138. FIG. 12A schematically shows collar 210 extending through groove 137d and holes 137i. FIG. 12A omits the view of auxiliary wheel retaining aperture 158, which is compressing collar tabs 212 together. FIGS. 11, 12, and 12A apply dashed lines to show hidden features. Hidden portions of collar 210 are shown with hatched lines.

Collar 210 extends around the complete circumference of groove 137d except for minor portion 137d-1 (shown in FIG. 12A). As such, only one collar 210 may be present in turbine assembly 100, even when a plurality of turbine tabs 138 are present. According to this embodiment, collar 210 engages only one of the plurality of turbine tabs 138. Because collar tabs 212 may only engage one turbine tab 138, only one pair of holes 137i may be defined in mount 137, even when multiple turbine tabs 138 are present.

FIG. 9 schematically shows a side cross sectional view of collar 210 assembled with mount 137 and auxiliary wheel 150. Although collar tabs 212 are shown to have a smaller radial height than turbine tab 138, such an arrangement is only exemplary. In practice, both collar tabs 212 and turbine tab 138 are sized to radially protrude from the top of retaining slot 158.

During the previously discussed balancing process, collar 210 may be machined, in addition to balance land 152, to improve the balance of turbine assembly 100. Because collar 210 is a non-critical component, similar to auxiliary wheel 150, no re-peening of machining deformations in collar 210 are necessary. 210 Collar 210 may be installed prior to the balance of turbine assembly 100 being tested.

Figure 13:
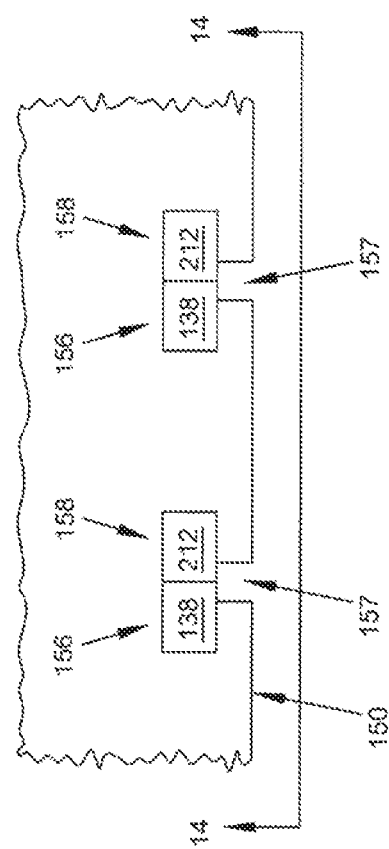
FIG. 13 is a schematic and fragmentary top plan view of a third set of modifications to the turbine assembly.
Figure 14:
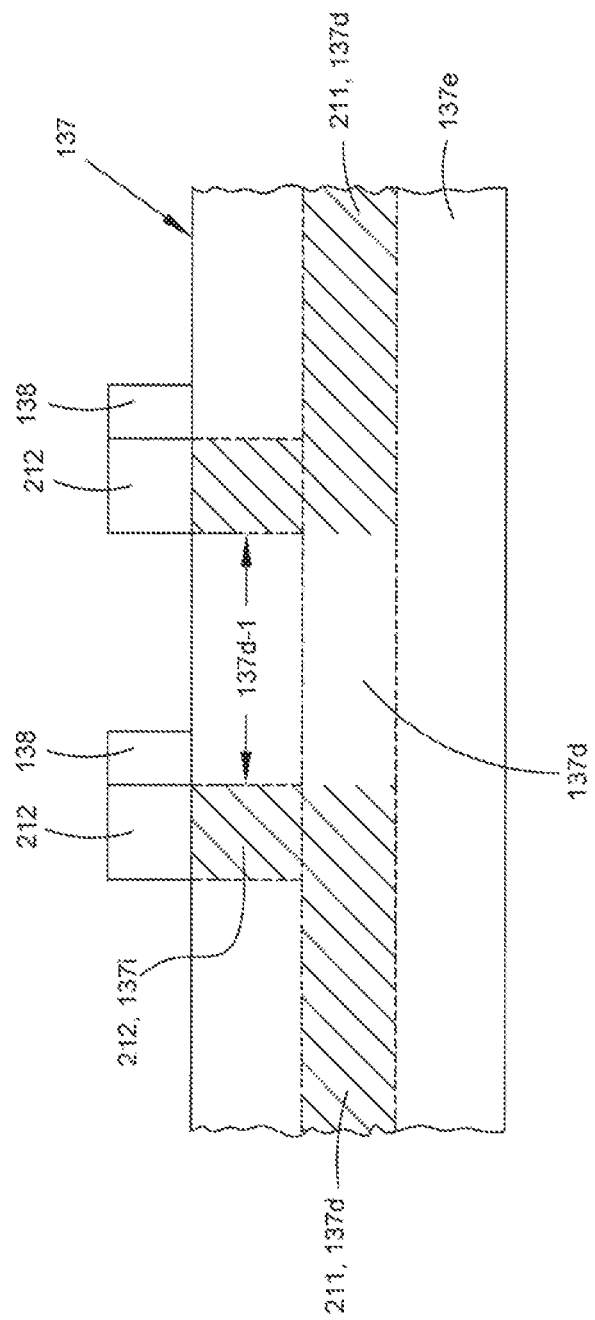
FIG. 14 is a schematic and fragmentary front plan view of the turbine disc of FIG. 11 with the collar of FIG. 9.

FIGS. 13 and 14 relate to a third set of possible modifications to turbine assembly 100. This set of modifications is to the second set of modifications (shown in FIGS. 7 to 12), except that each collar tab 212 engages a different turbine tab 138. Hidden features of FIGS. 13 and 14 are shown in dashed lines. Hidden portions of collar 210 are hatched.

With reference to FIG. 13, a pair of adjacent turbine tabs 138 have been clocked into a pair of adjacent apertures 156. More specifically, each turbine tab 138 was inserted, via a respective entry aperture 157, into retaining aperture 158. As stated above, turbine tab 158 may be sized to only fit through entry aperture 157 when turbine tab 158 has been shrunk and/or entry aperture 157 has been expanded. Alternatively, and as stated above, turbine tab 138 may be sized to always fit through entry aperture 157.

Auxiliary wheel 150 was then rotated clockwise to dispose turbine tabs 138 at the circumferential ends of retaining apertures 158. After turbine tabs 138 were rotated, retaining apertures 158 were partially vacant. To fill the vacant space in each retaining aperture 158, collar 210 was disposed within mount groove 137d such that collar tabs 212 filled up retaining apertures 158.

Collar tabs 212 may be sized to be slightly wider (in the circumferential direction) than the unoccupied portions of retaining apertures 158 such that each collar tab 212 is compressed between turbine tab 138, on one transverse end, and auxiliary wheel 150, on the opposing transverse end.

FIG. 14 omits auxiliary wheel 150, which is compressing collar tabs 212 against turbine tabs 138. The circumferential arc of collar 210 and mount 137 have been omitted for clarity. Consistent features of the modification of FIGS. 7 to 12A should be understood to apply to the modification of FIGS. 13 and 14. For example, some or all of the features described with reference to FIGS. 7, 8A, 8B, 9, and 10 may apply to the modification of FIGS. 13 and 14.

With reference to FIGS. 3 and 16A to 16C, a speed probe or sensor 190 is in close proximity to auxiliary wheel 150. Speed probe 190 is generally configured to sense properties of teeth 157 and channels 158. Based on a series of these measurements, controller 32 determines a speed of auxiliary wheel 150, and thus a speed of turbine disc 130. Speed probe 190 and/or controller 32 may function by known methods. Speed probe 190 may be inductive with a non-magnetic housing 191 partially enclosing and partially exposing a magnetized core 192. As the magnetized core 192 is exposed to the alternating series of teeth 157 and channels 158, core 192 generates an alternating voltage in a pick-up coil (not shown), which is connected to controller 32. When both teeth 157 and channels 158 are magnetic, as in FIG. 2, the change in radial depth between teeth 157 and channels 158 causes the magnetic field generated by core 192 to change, thus producing the alternating voltage.

Controller 32 maybe configured to convert the alternating voltage into a speed of turbine disc 130 based on elapsed time. According to some embodiments, sensor 190 is configured to report a first voltage (e.g., one) when core 192 is proximate to a tooth 157 and a second voltage (e.g., zero) when core 192 is proximate to a channel 158. According to other embodiments, sensor 190 is configured to report a first voltage when core 192 experiences a transition from a tooth 157 to a valley 158 and a second voltage (which may be equal to the first voltage) when core 192 experiences a transition from a channel 158 to a tooth 157.

Based on the time elapsed between voltage events, controller 32 estimates the speed of turbine disc 130. FIGS. 16A to 16C schematically illustrate teeth 157 and channels 158 passing probe 190. In FIG. 16B, the magnetic field between probe 190 and channel 158 may be weak (e.g., zero). In FIG. 16A, the magnetic field may be intermediate because tooth 157 is slightly offset from probe 190. In FIG. 16C, the magnetic field may be strong because tooth 157 is directly below probe 190. According to each of these Figures, probe 190 is fixed (i.e., static) while auxiliary wheel 150 rotates counterclockwise (rotation may alternatively be clockwise).

While magnetic sensing is an advantageous embodiment, speed of turbine disc 130 may be determined with other methods. For example, speed sensor 190 may be an optical sensor (e.g., a LIDAR detector) configured to distinguish between teeth 157 and channels 158 based on their measured radial depth, color (teeth 157 could be painted a different collar than channels 158), etc. As a result, target portion 154 includes first features (e.g., magnetic teeth 157) alternating with second features (e.g., non-magnetic channels 158) and the speed sensor 190 is configured to (a) distinguish between the first and second features and/or (b) determine when (i) a transition from one of the features to second features occurs and (ii) a transition from one of the second features to one of the first features occurs.

According to these alternate embodiments, controller 32 estimates rotational speed of turbine disc 130 based on the number of events that occur within an elapsed time. For example, controller 32 may estimate rotational speed based on one or any combination of the following: (a) the number of first features resolved by sensor 190 within an elapsed time, (b) the number of second features resolved by sensor 190 within an elapsed time, (c) the number of first to second feature transitions resolved by sensor 190 within an elapsed time, and/or (d) the number of second to first feature transitions resolved by sensor 190 within an elapsed time. As stated above, controller 32 may estimate rotational speed according to any known techniques.

It should thus be appreciated that probe 190 may be disposed adjacent to the annular target portion and configured to: transmit a signal to controller 32 (a) when probe 190 is proximate to one of the plurality of first features and/or (b) when probe 190 is proximate to a transition between one of the first features and one of the second features. Controller 32 may be configured to estimate a rotational speed of the rotor disc based on a number of the signals received within a counted time.

Returning to FIG. 1, speed sensor 30a is pointed at HP spool 26, speed sensor 30b is pointed at IP spool 25, and speed sensor 30c is pointed at LP spool. Speed sensors 30a, 30b, 30c may operate according to the same principles as speed probe 190. Speed sensors 30a, 30b, 30c directly measure the speed of their respective spools 26, 25, 24 (e.g., by measuring speed of a disc mounted about the spool). Each turbine includes a respective speed probe 190a, 190b, 190c. Each speed probe 190a, 190b, 190c may operate according to the same principles as speed probe 190 or may apply other suitable technology. Put differently, the above description of speed probe 190 may apply to any or all of speed probes 190a, 190b, 190c. Each speed probe 190a, 190b, 190c thus directly measures the speed of a auxiliary wheel 150 affixed to a respective turbine assembly 20, 22, 23.

According to one of many possible embodiments, controller 32 is configured to determine an overspeed condition of some or all of turbine assemblies 20, 22, 23. More specifically, controller 32 is configured to determine (a) the desired speed of HP spool 26 with respect to HP turbine assembly 20, (b) the desired speed of IP spool 25 with respect to IP turbine assembly 22, and (c) the desired speed of LP spool 24 with respect to LP turbine assembly 23. The speed of a spool 26, 25, 24 may be identical to its respective turbine 20, 22, 23 or, if a gearbox or transmission is intermediate, may be some fraction thereof. Controller 32 is configured to account for any intermediate gearbox or transmission when finding the desired spool speeds.

When the rotational speed of a spool 26, 25, 24 departs from its desired speed (which may be the speed of the coupled turbine, adjusted to reflect any intervening transmissions or gearboxes) by a predetermined amount (e.g., 1%, 5%, 10%), then controller 32 indicates a fault (also called an anomaly). If the fault lasts for a sufficient amount of time (e.g., 0 seconds or 0.1 seconds), then controller 32 commands fuel valve 35 to fully close, thus fully cutting fuel supply to engine 10. According to other embodiments, controller 32 commands fuel valve 35 to close an amount based on the magnitude of the fault (e.g., the percent between actual speed and desired speed) and thus fuel supply to engine 10 is cut based on the degree of closure of fuel valve 35. As such, controller 32 is configured to modulate, control, or adjust fuel valve 35 based on the detected speed of a turbine 20, 22, 23 and the detected speed of the turbine's respective spool 26, 25, 24.

The cockpit may include a heads-up display (e.g., one or more LCD or OLED displays and/or one or more LED lights). Upon detecting a fault, controller 32 may issue the warning by causing the heads-up display to display a predetermined message or one or more of the LED lights to activate (e.g., switch colors or illuminate). Controller 32 may be configured to show any or all of the measured speeds (e.g., the medium-term speed of LP spool 24. Controller 32 may be configured to show any or all of the differences between turbine speed and spool speed (e.g., when there is no intervening transmission or gearbox in IP spool 25, the measured speed of IP turbine assembly is 300,000 RPM and the measured speed of IP spool 25 is 270,000 RPM, controller 32 would show 90%).

Controller 32 may include a telematics unit with one or more antennas configured to broadcast wireless messages. Upon detecting a fault, controller 32 may automatically cause the telematics unit to immediately broadcast a wireless message indicating the fault.

This application has described multiple embodiments. For brevity and clarity, consistent features across the multiple embodiments may have only been described once. As such, any features described with respect to one embodiment should be understood to optionally apply to every other embodiment.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

We claim:
1. A turbomachine comprising:
a non-magnetic turbine disc carried by a rotating shaft; and
a system for detecting an overspeed condition of the non-magnetic turbine disc using a magnetic probe positioned in proximity to a magnetic target carried past the probe during rotation of the shaft, the system comprising:
an annular spanner nut threadably mounted on the non-magnetic turbine disc for axially engaging a turbine disc coverplate, said annular spanner nut comprising a speed sensor target having a plurality of teeth spaced about the circumference thereof.

2. The turbomachine of claim 1, wherein said annular spanner nut further comprises a balance land having an annular machinable surface.

3. A turbomachine comprising:
a turbine disc carried by a rotating shaft; and
a system for balancing the turbine disc, the system comprising a machinable surface positioned about a circumference of the disc, said system comprising:
an annular spanner nut threadably mounted on the disc for axially engaging a turbine disc coverplate, said annular spanner nut comprising a balance land having an annular machinable surface.

4. The turbomachine of claim 3, wherein said annular spanner nut further comprises a speed sensor target having a plurality of teeth spaced about the circumference thereof.

5. A turbine rotor assembly comprising:
a turbine disc carried by a rotating shaft;
a coverplate carried by said turbine disc;
an annular spanner nut threadably mounted to said turbine disc and axially engaging said coverplate, said spanner nut comprising a speed sensor target having a plurality of teeth spaced about the circumference thereof; and
a magnetic probe positioned proximate the speed sensor target so that rotation of the shaft carries the plurality of teeth past the probe, said probe being configured to detect the speed of the teeth passing the probe.

6. The turbine rotor assembly of claim 5, wherein said annular spanner nut further comprises a balance land having an annular machinable surface.

7. The turbine rotor assembly of claim 5, wherein the balance land is positioned axially intermediate of a threaded portion of said annular spanner nut and the speed sensor target.

8. A turbine rotor assembly comprising:
a turbine disc carried by a rotating shaft;
a coverplate carried by said turbine disc;
an annular spanner nut threadably mounted to said turbine disc and axially engaging said coverplate, said spanner nut comprising at least one of a speed sensor target having a plurality of teeth spaced about the circumference thereof or a balance land having an annular machinable surface.

9. The turbine rotor assembly of claim 8, wherein said annular spanner nut comprises a speed sensor target having a plurality of teeth spaced about the circumference thereof and a balance land having an annular machinable surface.

10. The turbine rotor assembly of claim 9, wherein said turbine disc is non-magnetic and said speed sensor target is magnetic.

11. The turbine rotor assembly of claim 9, wherein said balance land is positioned axially between a portion engaging said coverplate and said speed sensor target.

12. The turbine rotor assembly of claim 9, wherein said annular machinable surface faces radially outward.

13. The turbine rotor assembly of claim 9, wherein said plurality of teeth extend radially outward.

14. The turbomachine of claim 3, wherein the turbine disc is non-magnetic.

15. The turbine rotor assembly of claim 5, wherein the turbine disc is non-magnetic.

16. The turbomachine of claim 2, wherein the balance land is positioned axially intermediate of a threaded portion of said annular spanner nut and the speed sensor target.

17. The turbomachine of claim 3, wherein the balance land is positioned axially intermediate of a threaded portion of said annular spanner nut and the speed sensor target.

\* \* \* \* \*